(12) United States Patent
Kuramoto

(10) Patent No.: US 11,531,856 B2
(45) Date of Patent: Dec. 20, 2022

(54) PRINTING APPARATUS AND METHOD FOR CONTROLLING PRINTING APPARATUS

(71) Applicant: SEIKO EPSON CORPORATION, Tokyo (JP)

(72) Inventor: Hiroyuki Kuramoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 17/318,261

(22) Filed: May 12, 2021

(65) Prior Publication Data

US 2021/0357714 A1    Nov. 18, 2021

(30) Foreign Application Priority Data

May 15, 2020  (JP) .............................. JP2020-085773

(51) Int. Cl.
| | | |
|---|---|---|
| *B41J 3/36* | (2006.01) | |
| *G06K 15/00* | (2006.01) | |
| *G06K 15/02* | (2006.01) | |
| *B41J 29/387* | (2006.01) | |
| *G06K 15/10* | (2006.01) | |
| *B41J 2/155* | (2006.01) | |
| *B41J 29/393* | (2006.01) | |

(52) U.S. Cl.
CPC ............ *G06K 15/408* (2013.01); *B41J 2/155* (2013.01); *B41J 3/36* (2013.01); *B41J 29/387* (2013.01); *B41J 29/393* (2013.01); *G06K 15/002* (2013.01); *G06K 15/102* (2013.01); *G06K 15/1809* (2013.01)

(58) Field of Classification Search
CPC ......................................................... B41J 3/36
See application file for complete search history.

(56) References Cited

U.S. PATENT DOCUMENTS

| | | | |
|---|---|---|---|
| 2019/0283452 A1 | 9/2019 | Nishii et al. | |
| 2020/0288033 A1* | 9/2020 | Tokumaru | ............ H04N 1/1918 |
| 2021/0232347 A1* | 7/2021 | Kuramoto | ................ G06F 3/121 |
| 2021/0406622 A1* | 12/2021 | Moriyama | ........... G06K 15/105 |
| 2022/0169007 A1* | 6/2022 | Rohman | ............... B41J 2/04505 |

FOREIGN PATENT DOCUMENTS

| | | |
|---|---|---|
| JP | 2018-103477 | 7/2018 |
| JP | 2019-155890 | 9/2019 |

* cited by examiner

*Primary Examiner* — Julian D Huffman
(74) *Attorney, Agent, or Firm* — Workman Nydegger

(57) ABSTRACT

A printing apparatus that performs printing on a medium while being manually moved relative to the medium, the printing apparatus including a first discharger including a first nozzle row that discharges a first liquid, a second discharger including a second nozzle row that discharges a second liquid and is so provided as to be separate from the first nozzle row in a first direction perpendicular to the first nozzle row, a movement detection section that detects the moving direction of the printing apparatus viewed from the side facing the printing apparatus while the printing apparatus is moved, and an error process section that carries out an error process when printing using both the first and second dischargers is performed and the moving direction detected by the movement detection section deviates from the first direction.

11 Claims, 20 Drawing Sheets

PRINTING APPARATUS AND METHOD FOR CONTROLLING PRINTING APPARATUS

The present application is based on, and claims priority from JP Application Serial Number 2020-085773, filed May 15, 2020, the disclosure of which is hereby incorporated by reference herein in its entirety.

BACKGROUND

1. Technical Field

The present disclosure relates to a printing apparatus and a method for controlling the printing apparatus.

2. Related Art

There is a known printing apparatus that performs printing by discharging liquid onto a medium while being manually moved relative to the medium, as disclosed in JP-A-2019-155890.

The printing apparatus disclosed in JP-A-2019-155890, in which a plurality of nozzle rows via which the liquid is discharged are so provided as to be separate from each other in a first direction perpendicular to the nozzle rows, has the following problem. For example, when the printing apparatus performs printing using the plurality of nozzle rows, and the printing apparatus is moved in an oblique direction with respect to the first direction, the landing positions of the liquid discharged from the nozzles of a nozzle row shift from the landing positions of the liquid discharged from the nozzles of the other nozzle rows on the medium in the direction of the nozzle rows.

SUMMARY

A printing apparatus according to an aspect of the present disclosure is a printing apparatus that performs printing on a medium while being manually moved relative to the medium, the printing apparatus including a first discharger including a first nozzle row that discharges a first liquid, a second discharger including a second nozzle row that discharges a second liquid and is so provided as to be separate from the first nozzle row in a first direction perpendicular to the first nozzle row, a movement detection section that detects a moving direction of the printing apparatus viewed from a side facing the printing apparatus while the printing apparatus is moved, and an error process section that carries out an error process when printing using both the first and second dischargers is performed and the moving direction detected by the movement detection section deviates from the first direction.

A method for controlling a printing apparatus according to another aspect of the present disclosure is a method for controlling a printing apparatus including a first discharger including a first nozzle row that discharges a first liquid, a second discharger including a second nozzle row that discharges a second liquid and is so provided as to be separate from the first nozzle row in a first direction perpendicular to the first nozzle row, and a movement detection section that detects a moving direction of the printing apparatus viewed from a side facing the printing apparatus while the printing apparatus is moved, the printing apparatus performing printing on a medium by using at least one of the first and second dischargers while the printing apparatus is manually moved relative to the medium, the method including carrying out an error process when printing using both the first and second dischargers is performed and the moving direction detected by the movement detection section deviates from the first direction.

DESCRIPTION OF EXEMPLARY EMBODIMENTS

An embodiment of a printing apparatus and a method for controlling the printing apparatus will be described below with reference to the accompanying drawings.

Figure 1:
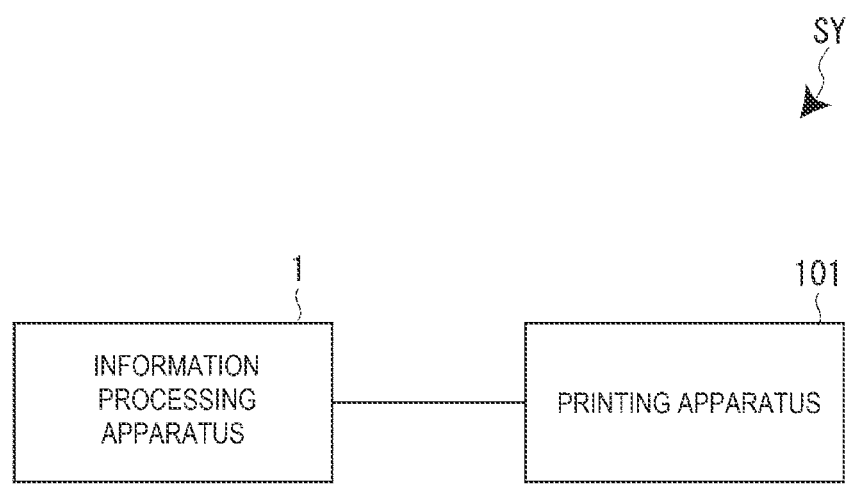
FIG. 1 is a system configuration diagram of a printing system.

FIG. 1 is a system configuration diagram of a printing system SY. The printing system SY includes an information processing apparatus 1 and a printing apparatus 101. The information processing apparatus 1 and the printing apparatus 101 are communicably connected to each other in a wired or wireless manner.

The information processing apparatus 1 transmits a print job to the printing apparatus 101. The information processing apparatus 1 can, for example, be a smartphone, a tablet terminal, or a personal computer.

The printing apparatus 101 performs printing on a medium 201 (see FIG. 4) based on the print job received from the information processing apparatus 1. The printing apparatus 101 is what is called a handy printer and performs printing while being manually moved relative to the medium 201. The medium 201 is not limited to a print sheet and can, for example, be an envelope, a postal card, a business card, a corrugated sheet, a notepad, and a CD (compact disc).

Figure 2:
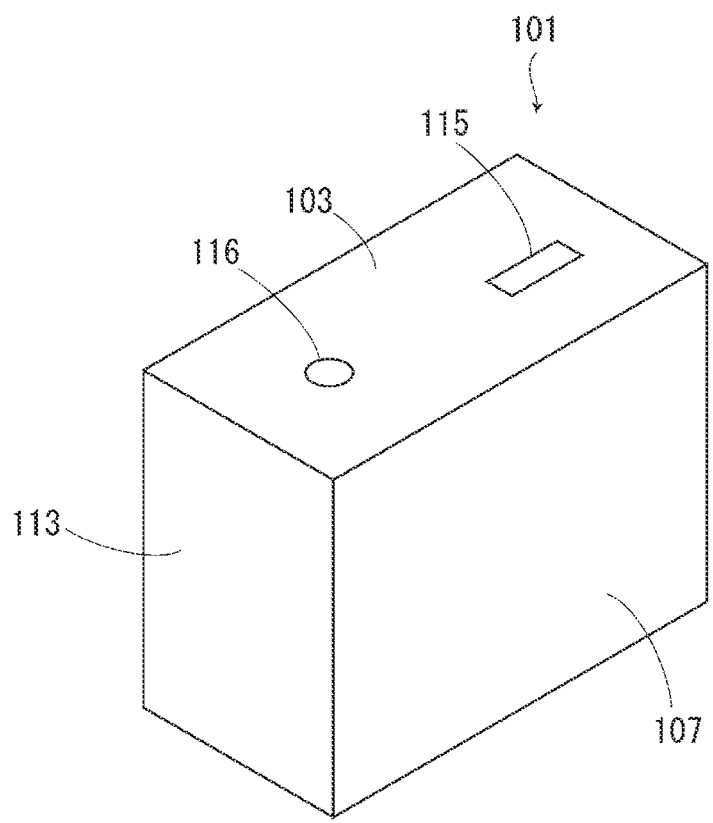
FIG. 2 is a perspective view of the exterior appearance of a printing apparatus.
Figure 2:
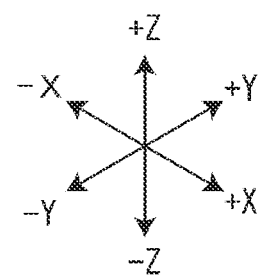

The external appearance configuration of the printing apparatus 101 will be described with reference to FIGS. 2 and 3. In the following description, the directions viewed from the side facing the printing apparatus 101 will be described by using directions in an XYZ orthogonal coordinate system shown in each figure. It is, however, noted that the directions are merely presented for convenience and do not at all limit the embodiment below.

The printing apparatus 101 has a substantially box-like shape. Out of the six outer surfaces of the printing apparatus 101, an outer surface at which a printing button 115, which will be described later, is provided is called a first outer surface 103, and the opposite outer surface from the first outer surface 103 is called a second outer surface 105. Assuming that the first outer surface 103 or the second outer surface 105 is the bottom surface, out of the four outer surfaces corresponding to the side surfaces, one of the two outer surfaces having a larger area is called a third outer surface 107, and the other is called a fourth outer surface 109. Further, out of the four outer surfaces corresponding to the side surfaces, one of the two outer surfaces having a smaller area is called a fifth outer surface 111, and the other is called a sixth outer surface 113. That is, the first outer surface 103, the second outer surface 105, the third outer surface 107, the fourth outer surface 109, the fifth outer surface 111, and the sixth outer surface 113 are provided on the positive side of the direction Z, the negative side of the direction Z, the positive side of the direction X, the negative side of the direction X, the positive side of the direction Y, and the negative side of the direction Y, respectively, when viewed from the side facing the printing apparatus 101.

The first outer surface 103 of the printing apparatus 101 is provided with the printing button 115 and a power button 116. The printing button 115 is an example of a "guide section."

Figure 8:
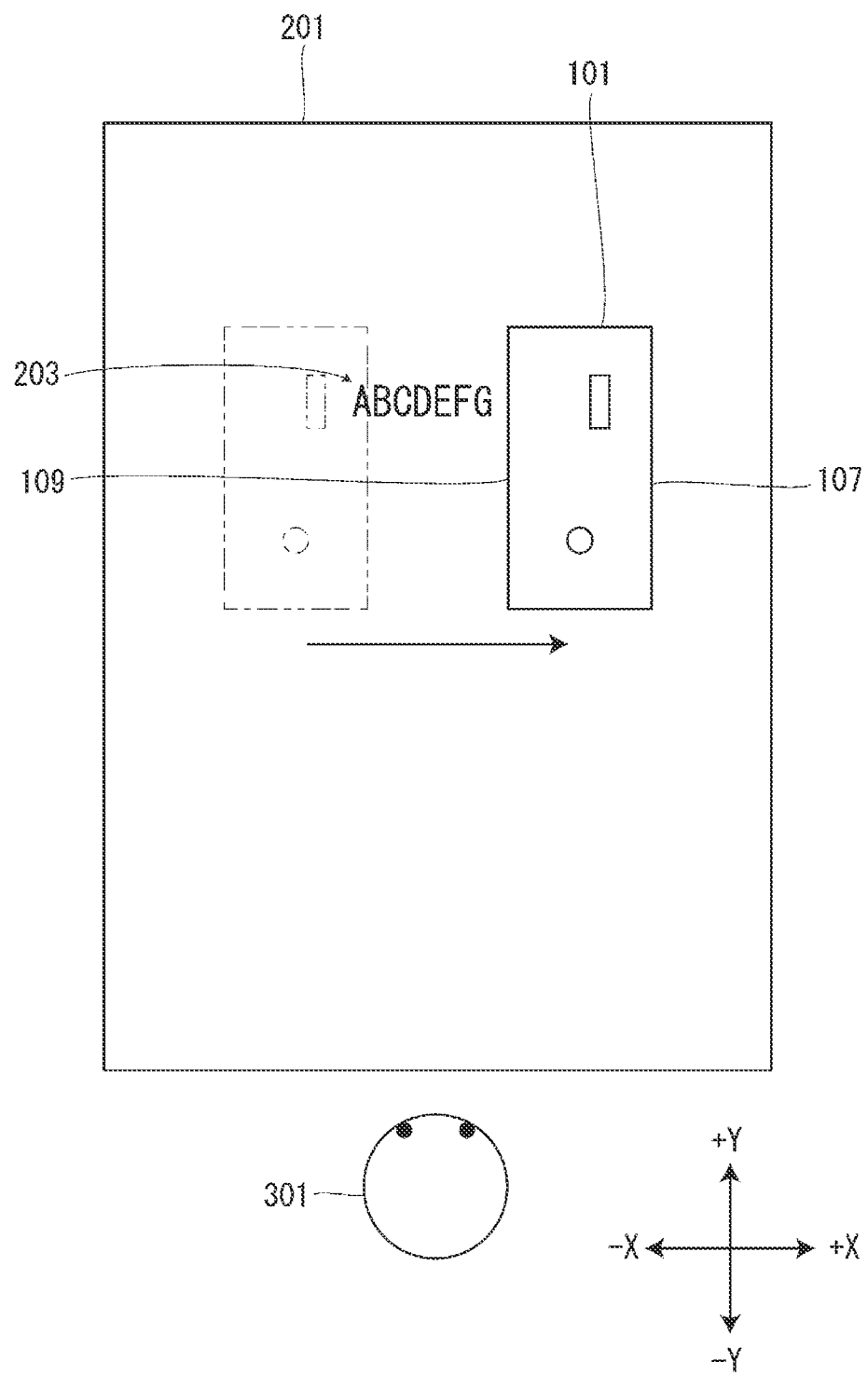
FIG. 8 shows the state in which the printing apparatus is moved in a direction +X.

The printing button 115 accepts a printing start instruction from a user 301 (see FIG. 8). The printing start instruction from the user 301 is issued, for example, by pressing the printing button 115 for a short period. The printing button 115 is provided in a position shifted from the center of the first outer surface 103 in the directions +Y and +X. The user 301 can print a print image 203 (see FIG. 8) by placing the printing apparatus 101 on the medium 201, then pressing the printing button 115 for a short period, and moving the grasped printing apparatus 101 along the surface of the medium 201 in a freehand manner.

The printing button 115 has a built-in LED (light emitting diode). The printing button 115, in which the LED flickers, performs error notification that will be described later. The printing button 115 accepts a printing cancellation instruction from the user 301. The printing cancelation instruction from the user 301 is issued, for example, by pressing the printing button 115 for a long period.

The power button 116 accepts a power ON/OFF switching instruction from the user 301. The power button 116 is provided in a position shifted from the center of the first outer surface 103 in the direction −Y.

Figure 3:
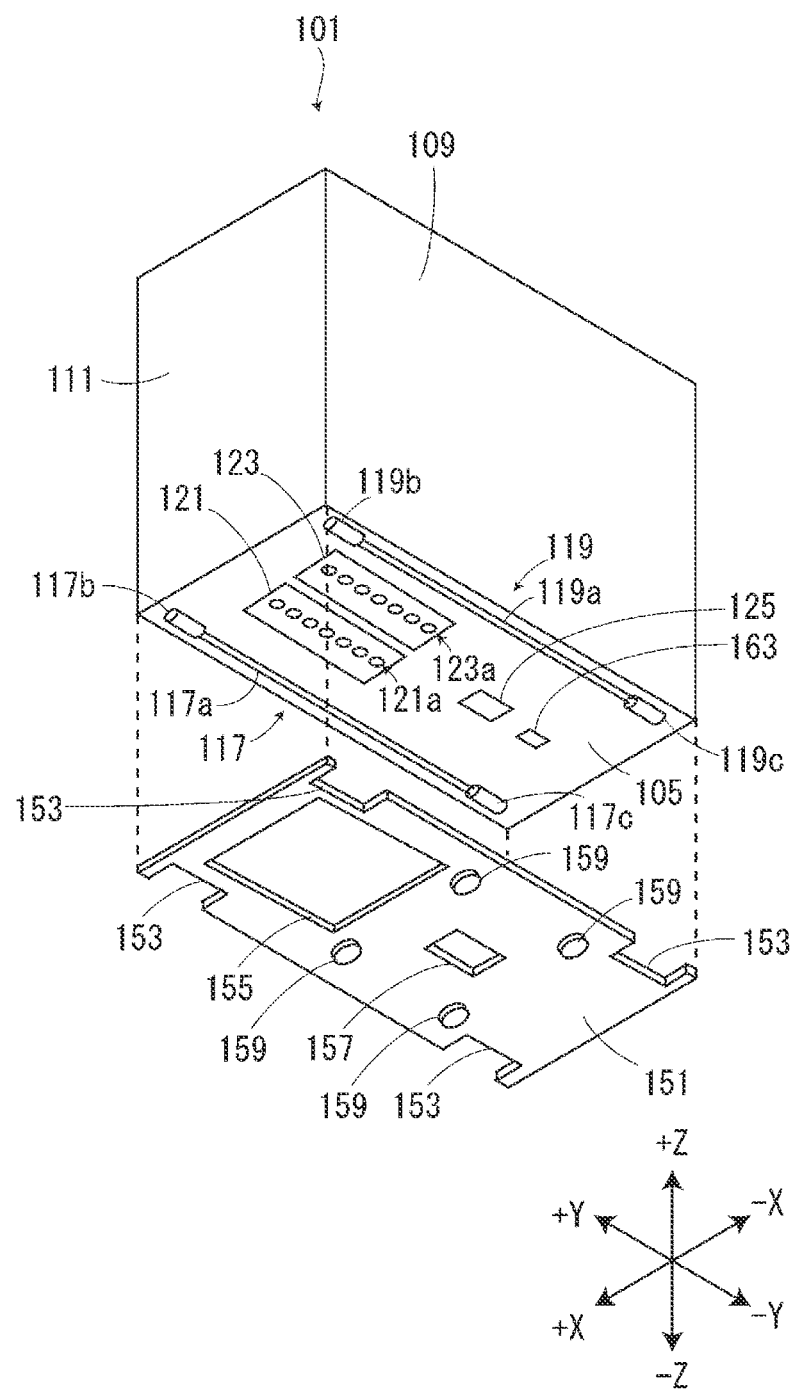
FIG. 3 is a perspective view of the exterior appearance of the printing apparatus and a spacer member.

The second outer surface 105 of the printing apparatus 101 is provided with a first roller unit 117, a second roller unit 119, a first printing head 121, a second printing head 123, a movement detection sensor 125, and a spacer member detection section 163, as shown in FIG. 3. The first roller unit 117 and the second roller unit 119 are an example of a "restriction member." The first printing head 121 is an example of a "first discharger," and the second printing head 123 is an example of a "second discharger." The movement detection sensor 125 is an example of a "movement detection section."

The first roller unit 117 is attached to an end portion of the second outer surface 105 that is an end portion facing the positive side of the direction X. The first roller unit 117 includes a first shaft member 117a, a first front roller 117b, which is fixed to an end portion of the first shaft member 117a that is an end portion facing the positive side of the direction Y, and a first rear roller 117c, which is fixed to an end portion of the first shaft member 117a that is an end portion facing the negative side of the direction Y. The first shaft member 117a engages with sliding bearings that are not shown, so that the first roller unit 117 is rotatably held by the sliding bearings.

The second roller unit 119 is attached to an end portion of the second outer surface 105 that is an end portion facing the negative side of the direction X. The second roller unit 119 includes a second shaft member 119a, a second front roller 119b, which is fixed to an end portion of the second shaft member 119a that is an end portion facing the positive side of the direction Y, and a second rear roller 119c, which is fixed to an end portion of the second shaft member 119a that is an end portion facing the negative side of the direction Y. The second shaft member 119a engages with sliding bearings that are not shown, so that the second roller unit 119 is rotatably held by the sliding bearings.

The second outer surface 105 of the printing apparatus 101 is so configured that a spacer member 151 is attachable to and detachable from the second outer surface 105. The spacer member 151 is an example of a "release member." The spacer member 151 is a substantially-rectangular-plate-shaped member and is configured to be attachable to and detachable from the second outer surface 105. The spacer member 151 has four roller cutouts 153, a head cutout 155, a sensor cutout 157, and four first protrusions 159.

The four roller cutouts 153 are so positioned as to face the first front roller 117b, the first rear roller 117c, the second front roller 119b, and the second rear roller 119c when the spacer member 151 is attached to the second outer surface 105 of the printing apparatus 101. The head cutout 155 is so positioned as to face the first printing head 121 and the second printing head 123 when the spacer member 151 is attached to the second outer surface 105 of the printing apparatus 101. The sensor cutout 157 is so positioned as to face the movement detection sensor 125 when the spacer member 151 is attached to the second outer surface 105 of the printing apparatus 101.

Two of the four first protrusions 159 are so provided as to be close to a side of the head cutout 155 that is the side facing the negative side of the direction Y with the two protrusions 159 being separate from each other in the direction X. The remaining two of the four first protrusions 159 are so provided as to be close to a side of the two roller cutouts 153 corresponding to the first rear roller 117c and the second rear roller 119c out of the four roller cutouts 153 that is the side facing the positive side of the direction Y with the two remaining protrusions 159 being separate from each other in the direction X.

When the spacer member 151 is attached to the printing apparatus 101, the surfaces of the four first protrusions 159 are farther from the second outer surface 105 than from the surfaces of the rollers of the first roller unit 117 and the second roller unit 119. Therefore, when the printing apparatus 101 to which the spacer member 151 has been attached is placed on the medium 201, the four first protrusions 159 are in contact with the medium 201, so that the rollers float from the surface of the medium 201. The printing apparatus 101 to which the spacer member 151 has been attached is thus allowed to slidably move on the medium 201.

The first roller unit 117 and the second roller unit 119 are intended to enhance linear travelability of the printing apparatus 101 in the direction X. The direction X is an example of a "first direction." For example, the first roller unit 117 is so configured that the first front roller 117b and the first rear roller 117c, which are fixed to the first shaft member 117a, integrally rotate. The rollers therefore rotate in the same direction at the same linear velocity and can hence guide the movement of the printing apparatus 101 relative to the medium 201 in the direction X. The same holds true for the second roller unit 119.

On the other hand, the spacer member 151 is intended to achieve curving travelability of the printing apparatus 101. When the spacer member 151 is attached to the second outer surface 105 of the printing apparatus 101, the rollers of the first roller unit 117 and the second roller unit 119 are not in contact with the medium 201 as described above and do not therefore provide the linear travelability. Therefore, the first roller unit 117 and the second roller unit 119 function as the restriction member, which restricts movement of the printing apparatus 101 in directions other than the direction X, whereas the spacer member 151 functions as the release member, which releases the restriction imposed by the restriction member.

Figure 4:
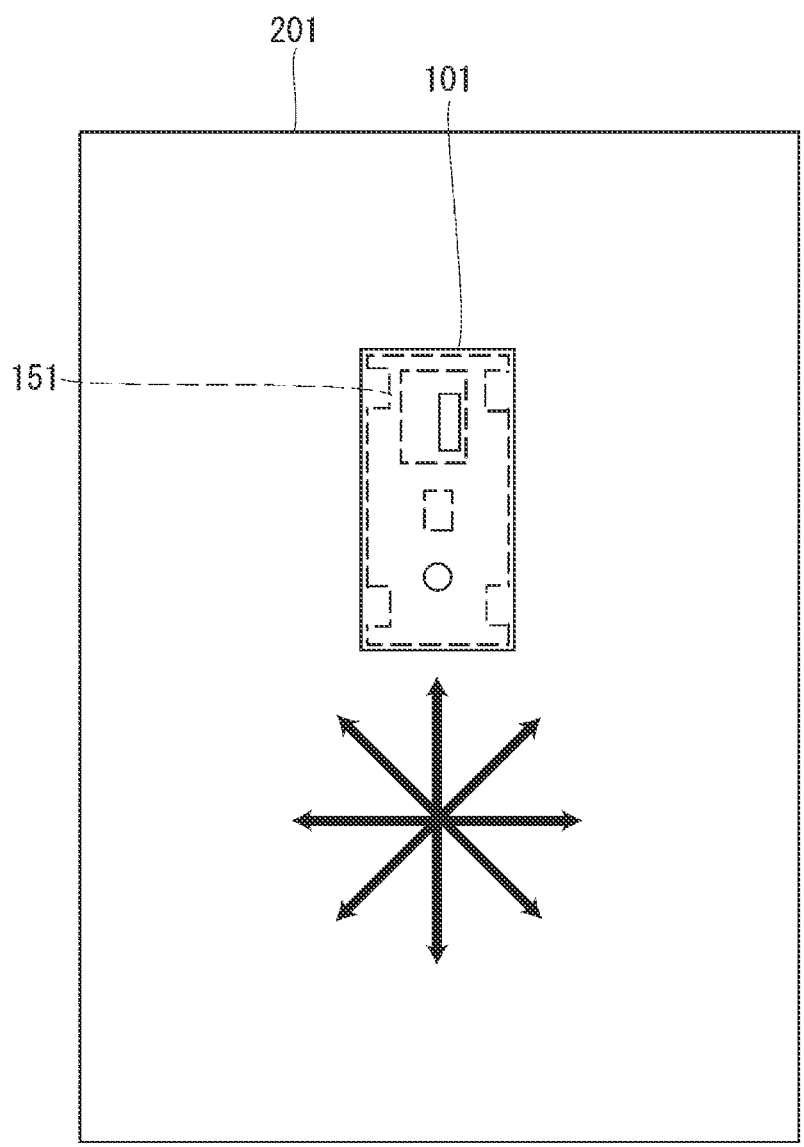
FIG. 4 describes a first mode.
Figure 4:
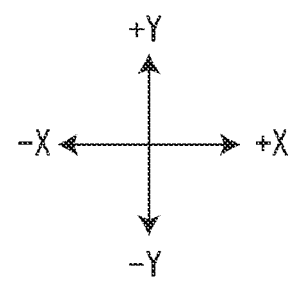

A mode in which the printing apparatus 101 operates with the spacer member 151 attached to the printing apparatus 101 is hereinafter referred to as a "first mode." When the printing apparatus 101 operates in the first mode, the printing apparatus 101 is allowed to move not only in the direction X but in oblique directions with respect to the direction X and the direction perpendicular to the direction X, as shown in FIG. 4.

Figure 5:
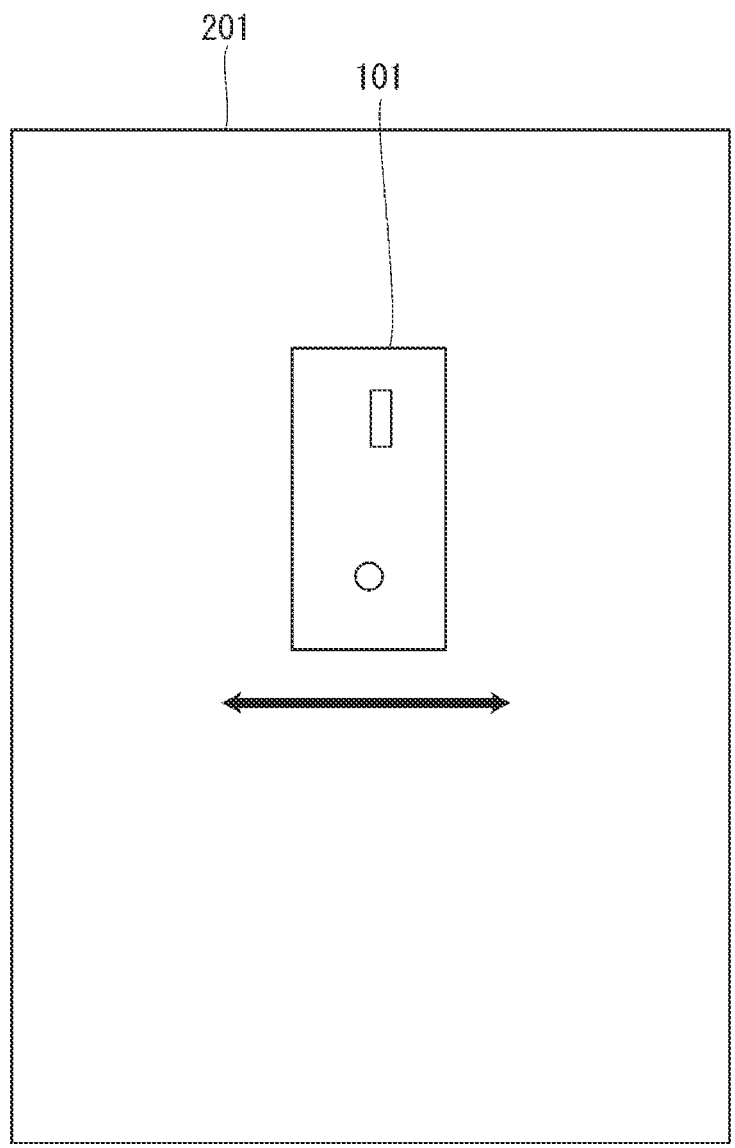
FIG. 5 describes a second mode.
Figure 5:
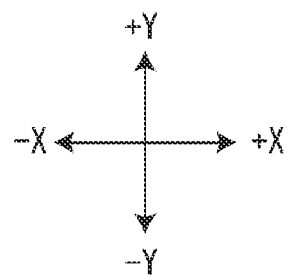

A mode in which the printing apparatus 101 operates with the spacer member 151 not attached to the printing apparatus 101 is referred to as a "second mode." When the printing apparatus 101 operates in the second mode, the printing apparatus 101 is allowed to move in the direction X but is not allowed to move in oblique directions with respect to the direction X or the direction perpendicular to the direction X, as shown in FIG. 5.

The description will be made with reference to FIG. 3 again. The first printing head 121 and the second printing head 123 discharge ink via nozzles to print the print image 203 on the medium 201. The first printing head 121 and the second printing head 123 are provided in positions shifted from the center of the second outer surface 103 in the direction +Y. The first printing head 121 is provided in a position shifted from the second printing head 123 in the direction +X.

The movement detection sensor 125 detects the amount of movement of the printing apparatus 101 in the directions X and Y while the printing apparatus 101 is moved relative to the medium 201. The movement detection sensor 125 is provided in a position shifted from the first printing head 121 and the second printing head 123 in the direction −Y.

The spacer member detection section 163 detects whether or not the spacer member 151 has been attached. The spacer member detection section 163 is provided in a position shifted from the movement detection sensor in the direction −Y.

The first printing head 121 is an inkjet head including a first nozzle row 121a. The second printing head 123 is an inkjet head including a second nozzle row 123a. The first nozzle row 121a and the second nozzle row 123a each include a plurality of nozzles arranged along the direction Y in parallel thereto and are so provided as to be separate from each other in the direction X. Further, the first nozzle row 121a and the second nozzle row 123a include the same number of nozzles that are arranged at the same intervals, and the two nozzle rows are disposed at the second outer surface 105 in the same position in the direction Y.

In the above description, the first nozzle row 121a and the second nozzle row 123a are provided in parallel to the direction Y. The term "parallel" is not intended to mean only parallelism in the exact sense but permits a tolerance acceptable in the art to which the present embodiment belongs. Further, the first nozzle row 121a and the second nozzle row 123a are so provided as to be separate from each other in the direction X perpendicular to the direction Y in the above description. The term "perpendicular" does not mean only perpendicularity in the exact sense but permits tolerance acceptable in the art to which the present embodiment belongs.

The ink discharged via the nozzles of the first nozzle row 121a may be the same as or differ from the ink discharged via the nozzles of the second nozzle row 123a. It is assumed in the following description that black ink is discharged via the nozzles of the first nozzle row 121a, and that red ink is discharged via the nozzles of the second nozzle row 123a. That is, the printing apparatus 101 according to the present embodiment achieves multicolor printing by performing printing using the first printing head 121 and the second printing head 123 and achieves single-color printing by performing printing using only the first printing head 121. The black ink is an example of a "first liquid," and the red ink is an example of a "second liquid."

Figure 6:
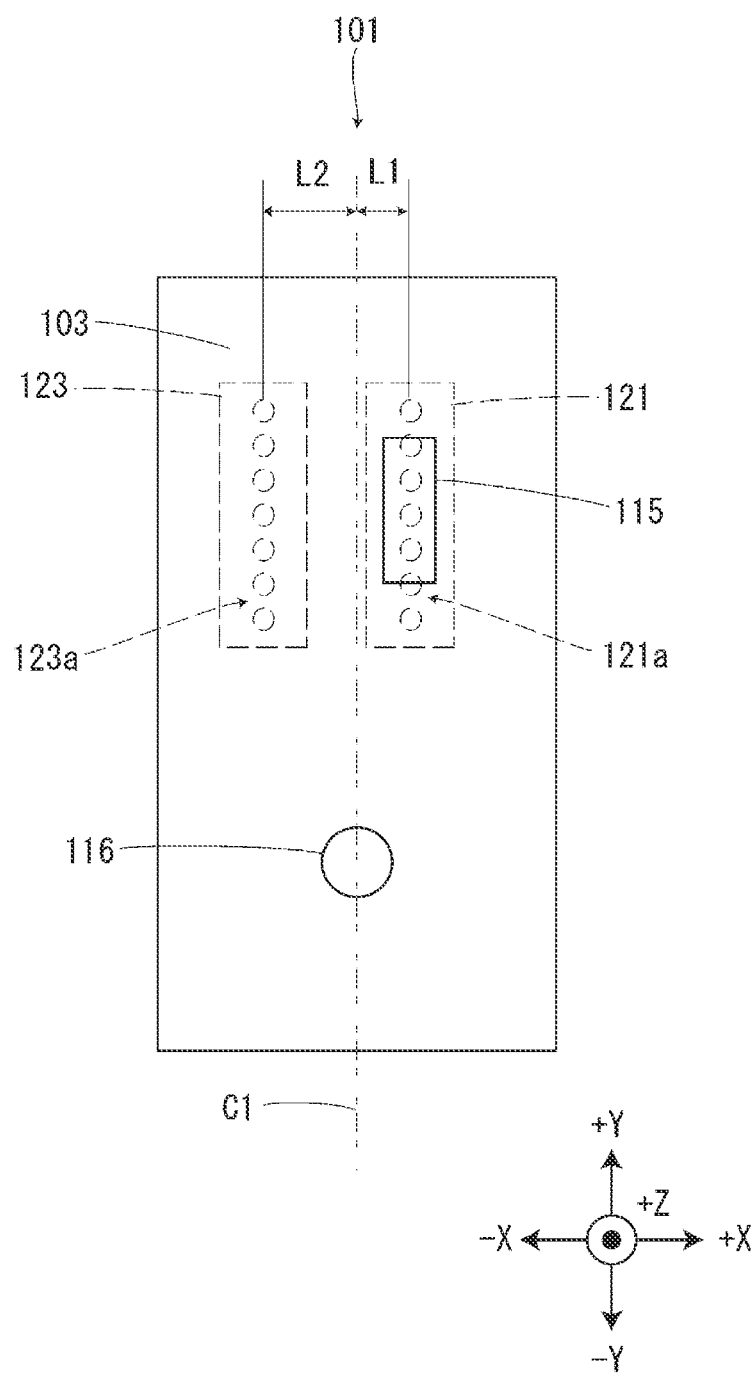
FIG. 6 shows the printing apparatus viewed from the positive side of a direction Z.
Figure 7:
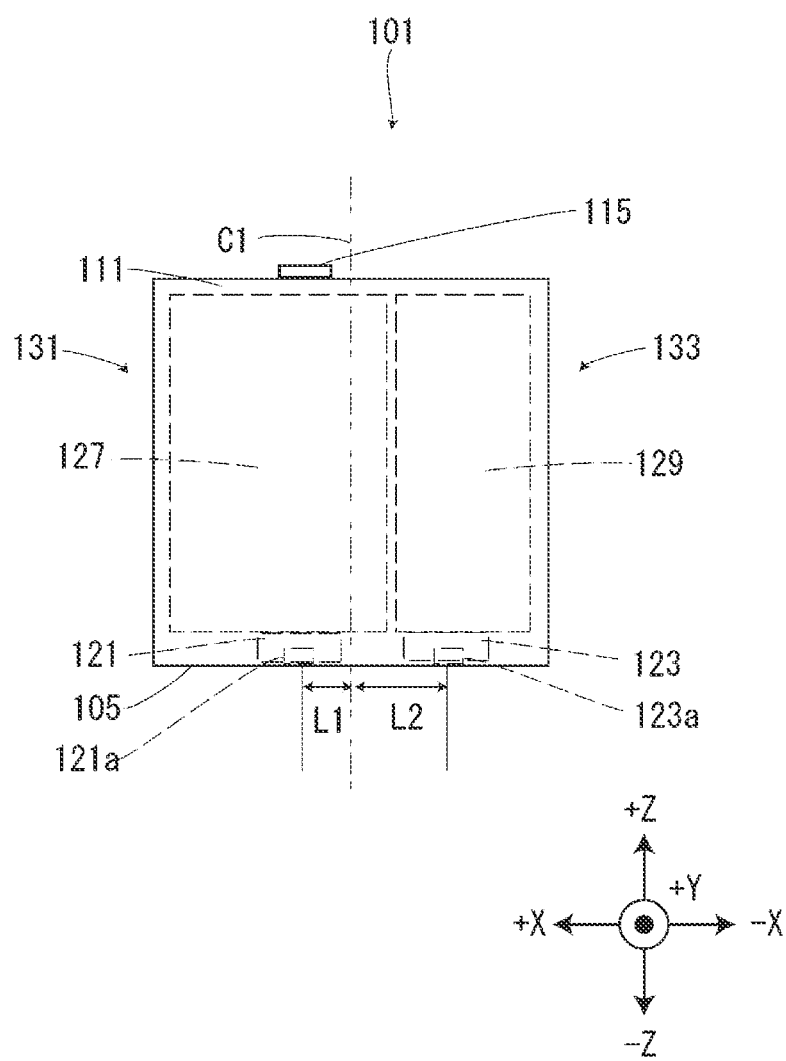
FIG. 7 shows the printing apparatus viewed from the positive side of a direction Y.

The first printing head 121 is so provided as to be closer to the center of the printing apparatus 101 in the direction X than the second printing head 123, as shown in FIGS. 6 and 7. That is, a first distance L1, which is the distance between a center position C1 on the second outer surface 105 in the direction X and the first nozzle row 121a of the first printing head 121, is shorter than a second distance L2, which is the distance between the center position C1 and the second nozzle row 123a of the second printing head 123.

The printing button 115 is provided in a position shifted from the first printing head 121 in the direction +Z. That is, the printing button 115 is provided at the first outer surface 103 in a position corresponding to the first printing head 121. The situation in which the printing button 115 is provided in a position corresponding to the first printing head 121 means that the printing button 115 falls within the range of the first printing head 121 in the directions X and Y. The thus positioned printing button 115 can show the user 301 the position where the first printing head 121 is provided, that is, the position where the first printing head 121 performs printing. The printing apparatus 101 can perform single-color printing using only the black ink and the multicolor printing using the black ink and the red ink, and it is believed that the consumption of the black ink is greater than that of the red ink. The usability of the printing apparatus 101 can therefore be improved by showing the user 301 the position where the first printing head 121 performs printing instead of the position where the second printing head 123 performs printing.

A black ink cartridge 131 and a red ink cartridge 133 are loaded into the printing apparatus 101, as shown in FIG. 7.

The black ink cartridge 131 includes a black ink tank 127 and the first printing head 121. The first printing head 121 is provided at a side of the black ink tank 127 that is the side facing the negative side of the direction Z. The black ink tank 127 accommodates the black ink and supplies the first printing head 121 with the black ink.

The red ink cartridge 133 includes a red ink tank 129 and the second printing head 123. The second printing head 123 is provided at a side of the red ink tank 129 that is the side facing the negative side of the direction Z. The red ink tank 129 accommodates the red ink and supplies the second printing head 123 with the red ink.

The black ink cartridge 131 is provided in a position shifted from the red ink cartridge 133 in the direction +X, and the amount of ink accommodated in the black ink cartridge 131 is greater than the amount of ink accommodated in the red ink cartridge 133.

Since it is believed that the consumption of the black ink is greater than that of the red ink, as described above, the printing apparatus 101 is so designed that the amount of ink stored in the black ink tank 127 is greater than the amount of ink stored in the red ink tank 129. In accordance with the design described above, providing the second printing head 123 at the second outer surface 105 in a position farther from the center position C1 in the direction X than the first printing head 121 allows the second printing head 123 to be disposed immediately below the red ink tank 129, that is, on a side of the red ink tank 129 that is the side facing the negative side of the direction Z. The arrangement described above allows the red ink supply path from the red ink tank 129 to the second printing head 123 to be shortened. Further, even when the first printing head 121 is so disposed as to be closest possible to the second printing head 123 in the direction X, the first printing head 121 can be disposed immediately below the black ink tank 127, whereby the black ink supply path from the black ink tank 127 to the first printing head 121 can also be shortened.

The printing apparatus 101 can print the print image 203 on the medium 201 while being moved in the direction +X when viewed from the side facing the printing apparatus 101, as shown in FIG. 8. The printing apparatus 101 can print the print image 203 on the medium 201 also while being moved in the direction −X when viewed from the side facing the printing apparatus 101. The situation in which the printing apparatus 101 is moved in the direction +X when viewed from the side facing the printing apparatus 101 means that the printing apparatus 101 is so moved that the third outer surface 107 faces the side toward which the printing apparatus 101 is moved. The situation in which the printing apparatus 101 is moved in the direction −X when viewed from the side facing the printing apparatus 101 means that the printing apparatus 101 is so moved that the fourth outer surface 109 faces the side toward which the printing apparatus 101 is moved.

When one print job cannot be completed in one pass, the printing apparatus 101 can perform the print job in a plurality of passes. The term "pass" refers to a printing action performed while the printing apparatus 101 is moved in one direction, the direction +X or −X.

As described above, to perform one print job in a plurality of passes, the user 301 can select one-way printing or two-way printing as the moving direction of the information processing apparatus 1. For example, when the one-way printing is selected, the user 301 repeats the action of performing printing corresponding to one pass while moving the printing apparatus 101 in the direction +X and then the action of moving the printing apparatus 101 in the directions −X and −Y to start a new line. On the other hand, when the two-way printing is selected, the user 301 repeats the action of performing printing corresponding to one pass while moving the printing apparatus 101 in the direction +X, then the action of moving the printing apparatus 101 in the direction −Y to start a new line, the action of performing printing corresponding to the next pass while moving the printing apparatus 101 in the direction −X, and then the action of moving the printing apparatus 101 in the direction −Y to start a new line.

A print job specifies the moving direction of the printing apparatus 101 on a pass basis. A print job can be divided into sub-print jobs on a pass basis, and the sub-print jobs are each called a "pass-basis job." For example, in the one-way printing, the specified direction is the direction +X for all pass-basis jobs. In the two-way printing, the specified direction is the direction +X for odd-numbered pass-basis jobs, and the specified direction is the direction −X for even-numbered pass-basis jobs.

Print data contained in a pass-basis job corresponds to the specified moving direction of the printing apparatus 101. For example, a pass-basis job in which the direction +X is specified as the specified direction contains print data for printing an appropriate print image 203 when the printing apparatus 101 is moved in the direction +X. A pass-basis job in which the direction −X is specified as the specified direction contains print data for printing an appropriate print image 203 when the printing apparatus 101 is moved in the direction −X.

Figure 9:
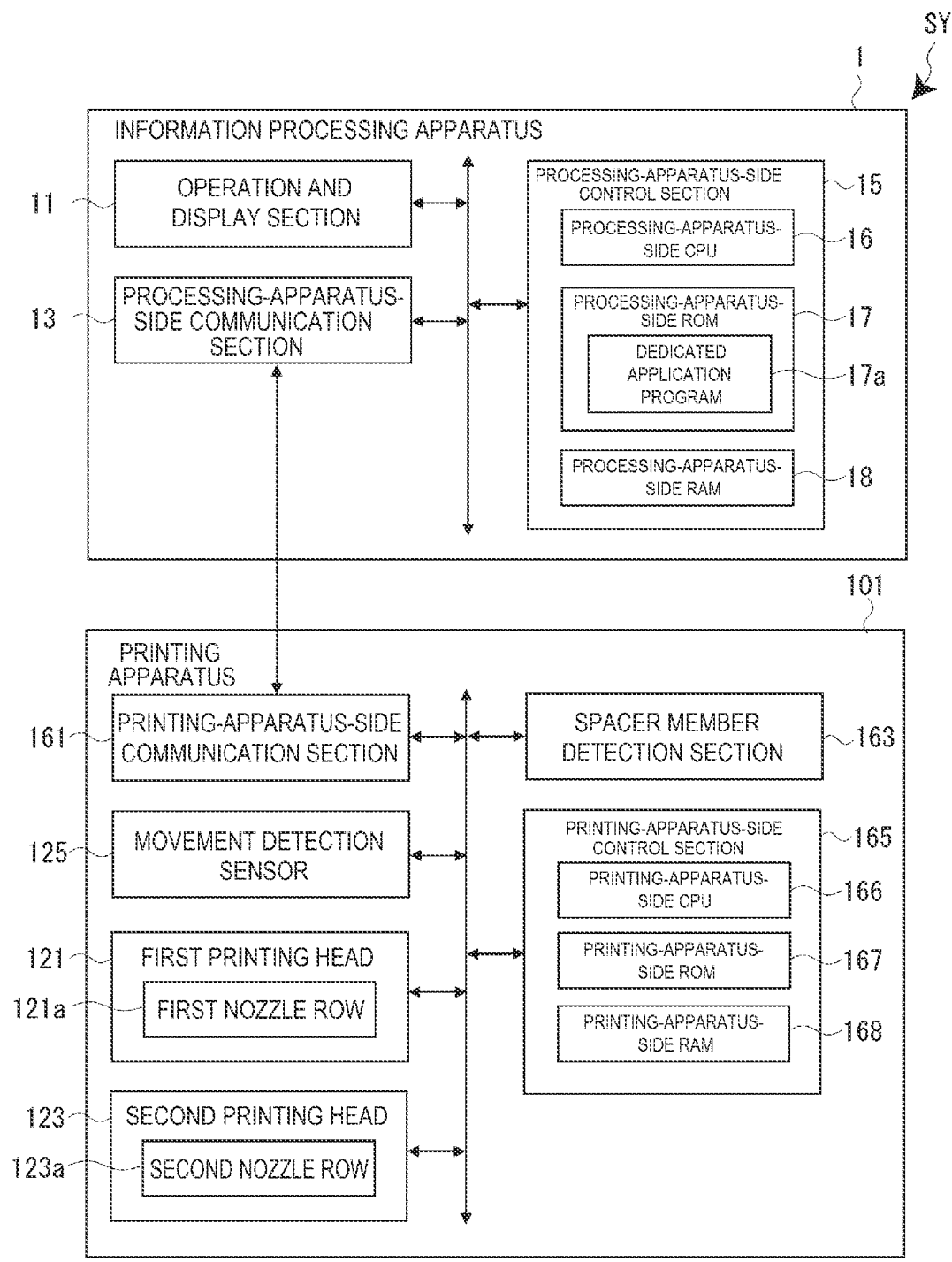
FIG. 9 is a control block diagram of the printing system.

The hardware configuration of the printing system SY will be described below with reference to FIG. 9. The printing system SY includes the information processing apparatus 1 and the printing apparatus 101. The information processing apparatus 1 includes an operation and display section 11, a processing-apparatus-side communication section 13, and a processing-apparatus-side control section 15.

The operation and display section 11 is, for example, a touch panel and is used to allow the user 301 to perform a variety of types of operation and display a variety of types of information. The operation and display section 11 displays, for example, a printing instruction screen 21 (see FIG. 10) and a printing setting screen 31 (see FIG. 11).

Figure 10:
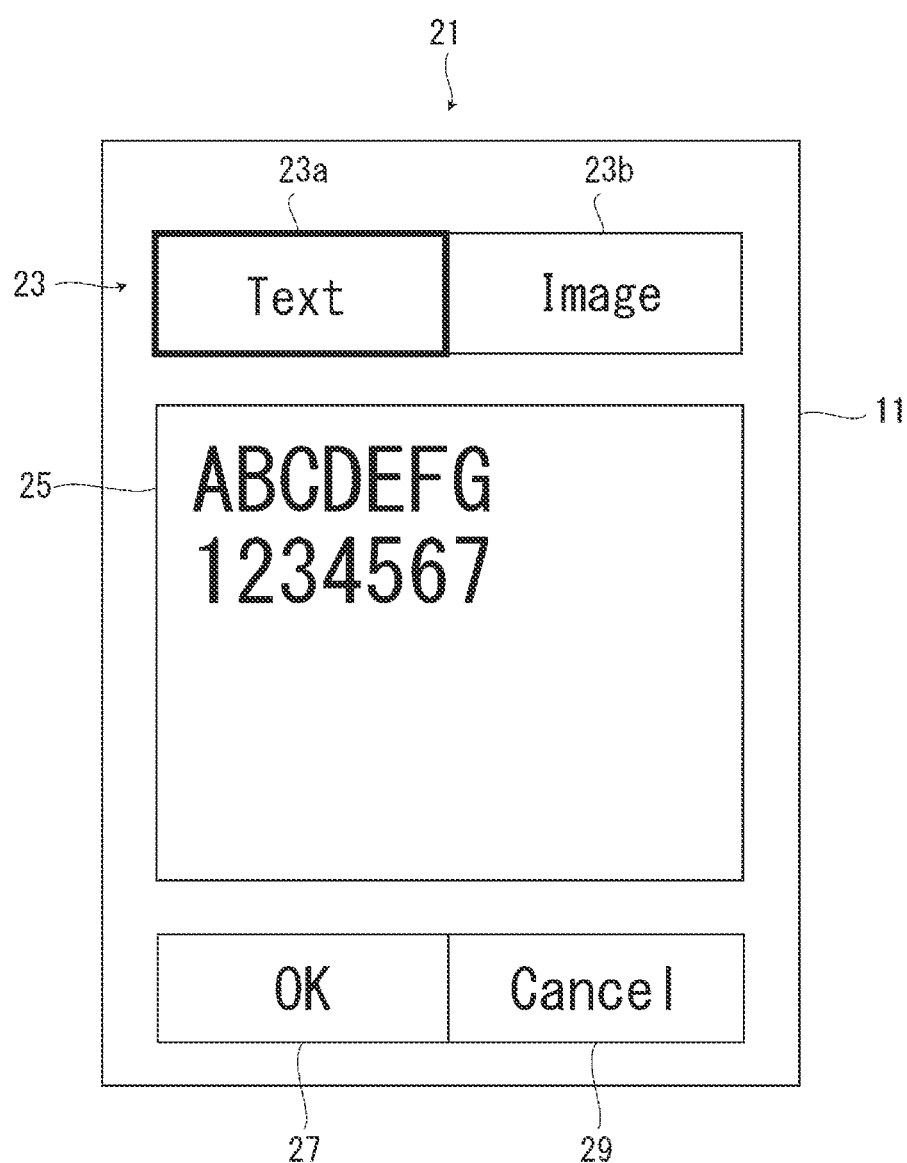
FIG. 10 shows a printing instruction screen.

The printing instruction screen 21 and the printing setting screen 31 will be described. The printing setting screen 21 has a print type selection field 23, an information input field 25, a first OK button 27, and a first cancellation button 29, as shown in FIG. 10.

The print type selection field 23 displays a text option 23a and an image option 23b as a selectable option. When the text option 23a is selected in the print type selection field 23, a text is inputted to the information input field 25. The text is, for example, letters, numerals, symbols, or pictorial symbols inputted via a software keyboard that is not shown and refers to information to which a text code is added. When the image option 23b is selected in the print type selection field 23, an image is drawn in or inserted into the information input field 25. The image refers to information to which no text code is added.

The information input field 25 displays a text inputted when the text option 23a is selected in the print type selection field 23. The information input field 25 displays an image drawn or inserted when the image option 23b is selected in the print type selection field 23.

The first OK button 27 accepts the user's operation of finalizing the information inputted via the printing instruction screen 21. When the information processing apparatus 1 accepts the operation performed on the first OK button, the information processing apparatus 1 finalizes the inputted information and displays the printing setting screen 31. The first cancellation button 29 accepts operation of canceling the information inputted via the printing instruction screen 21. When the information processing apparatus 1 accepts the operation performed on the first cancellation button 29, the information processing apparatus 1 resets the information inputted via the printing instruction screen 21 and displays an initial screen that is not shown.

Figure 11:
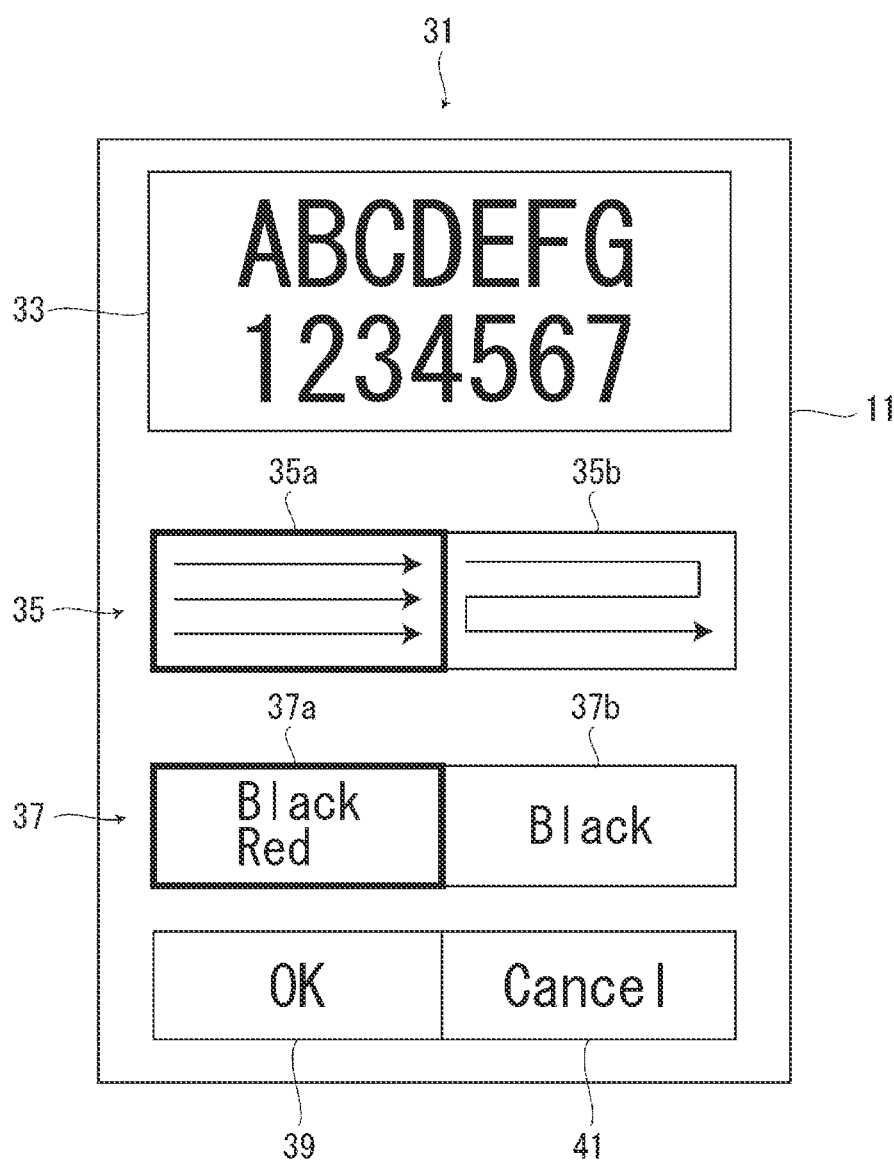
FIG. 11 shows a printing setting screen.

The printing setting screen 31 has a print preview 33, a moving direction selection field 35, a print color selection field 37, a second OK button 39, and a second cancellation button 41, as shown in FIG. 11.

The print preview 33 displays a preview of the print image 203 based on the information inputted via the information input field 25 of the printing instruction screen 21.

The moving direction selection field 35 displays a one-way printing option 35a and a two-way printing option 35b as a selectable option. When the print image 203 can be printed in one pass, only the one-way printing option 35a may be selectable, and the two-way printing option 35b may be unselectable.

The print color selection field 37 displays a multicolor printing option 37a and a single-color printing option 37b as a selectable option. When the multicolor printing option 37a is selected, the information processing apparatus 1 generates print data for printing the print image 203 in black and red. When the single-color printing option 37b is selected, the information processing apparatus 1 generates print data for printing the print image 203 only in black. The print data for printing the print image 203 in black and red is hereinafter referred to as "print data for multicolor printing." The print data for printing the print image 203 only in black is hereinafter referred to as "print data for single-color printing."

The information processing 1 generates print data based on the information inputted to the information input field 25 of the printing instructing screen 21, as described above. It is, however, noted that when the inputted information is information representing a color text or image, the information processing apparatus 1 generates black and red two-color print data or black one-color print data by performing predetermined color conversion on the inputted information.

The second OK button 39 accepts the user's operation of finalizing the selection performed via the printing setting screen 31. When the information processing apparatus 1 accepts the operation performed on the second OK button 39, the information processing apparatus 1 generates print data and transmits a print job containing the generated print data, information representing the print type, and information representing the specified direction to the printing apparatus 101. The second cancellation button 41 accepts operation of canceling selection performed via the printing setting screen 31. When the information processing apparatus 1 accepts the operation performed on the second cancellation button 41, the information processing apparatus 1 resets the settings of the printing setting screen 31 and displays the printing instruction screen 21.

The description will be made with reference to FIG. 9 again. The processing-apparatus-side communication section 13 communicates with the printing apparatus 101, for example, in a wireless manner. For example, the processing-apparatus-side communication section 13 transmits a print job to the printing apparatus 101.

The processing-apparatus-side control section 15 includes a processing-apparatus-side CPU (central processing unit) 16, a processing-apparatus-side ROM (read only memory) 17, and a processing-apparatus-side RAM (random access memory) 18.

The processing-apparatus-side CPU 16 develops in the processing-apparatus-side RAM 18 a variety of control programs stored in the processing-apparatus-side ROM 17 and executes the programs to perform a variety of types of control. The processing-apparatus-side control section 15 may use a hardware circuit, such as an ASIC (application specific integrated circuit), as a processor in place of the processing-apparatus-side CPU 16. The processor may have a configuration in which hardware circuits, such as one or more CPUs and ASICs, cooperate with one another.

The processing-apparatus-side ROM 17 is a rewritable ROM, such as a flash memory, and stores the variety of control programs and a variety of control data. The processing-apparatus-side RAM 18 is used as a work area where the processing-apparatus-side CPU 16 performs the variety of types of control.

The processing-apparatus-side ROM 17 stores a dedicated application program 17a for controlling the printing apparatus 101. The processing-apparatus-side CPU 16 uses the dedicated application program 17a to display the printing instruction screen 21 and the printing setting screen 31 described above.

The processing-apparatus-side CPU 16 uses the dedicated application program 17a to generate a print job. More specifically, the processing-apparatus-side CPU 16 generates a print job based on information inputted via the printing instruction screen 21 and the settings of the printing setting screen 31.

The printing apparatus 101 includes a printing-apparatus-side communication section 161, the movement detection sensor 125, the first printing head 121, the second printing head 123, the spacer member detection section 163, and a printing-apparatus-side control section 165. The spacer member detection section 163 is an example of a "first attachment detection section."

The printing-apparatus-side communication section 161 communicates with the information processing apparatus 1, for example, in a wireless manner.

The movement detection sensor 125 optically reads minute irregularities of the medium 201 while the printing apparatus 101 is moved relative to the medium 201, and the movement detection sensor 125 outputs a movement detection signal.

The first printing head 121 has the first nozzle row 121a, where a plurality of nozzles are arranged. The first printing head 121 discharges the black ink via the plurality of nozzles to perform printing on the medium 201.

The second printing head 123 has the second nozzle row 123a, where a plurality of nozzles are arranged. The second printing head 123 discharges the red ink via the plurality of nozzles to perform printing on the medium 201.

The spacer member detection section 163 detects whether or not the spacer member 151 has been attached to the second outer surface 105 of the printing apparatus 101. The spacer member detection section 163 is formed of a physical switch that is so provided as to protrude from the second outer surface 105 and sinks into the second outer surface 105 when the spacer member 151 is attached. When the spacer member detection section 163 detects that the spacer member 151 has been attached, the spacer member detection section 163 outputs a predetermined signal representing that the spacer member 151 has been attached.

The printing-apparatus-side control section 165 includes a printing-apparatus-side CPU 166, a printing-apparatus-side ROM 167, and a printing-apparatus-side RAM 168.

The printing-apparatus-side CPU 166 develops in the printing-apparatus-side RAM 168 a variety of control programs stored in the printing-apparatus-side ROM 167 and executes the programs to perform a variety of types of control. The printing-apparatus-side control section 165 may use a hardware circuit, such as an ASIC (application specific integrated circuit), as a processor in place of the printing-apparatus-side CPU 166. The processor may have a configuration in which hardware circuits, such as one or more CPUs and ASICs, cooperate with one another.

The printing-apparatus-side ROM 167 stores the variety of control programs and a variety of control data. The printing-apparatus-side RAM 168 is used as a work area where the printing-apparatus-side CPU 166 performs the variety of types of control.

The printing-apparatus-side CPU 166 calculates the distance over which the printing apparatus 101 has moved in the directions X and Y based on the movement detection signal outputted from the movement detection sensor 125. The printing-apparatus-side CPU 166 controls the first printing head 121 and the second printing head 123 to cause the printing heads to print the print image 203 on the medium 201 based on the calculated movement distance in the directions X and Y. More specifically, the printing-apparatus-side CPU 166 causes the first printing head 121 and the second printing head 123 to discharge the ink via the nozzles thereof at timings based on the calculated movement distance in the direction X. The printing apparatus 101 can thus appropriately print the print image 203 on the medium 201 irrespective of the speed at which the user 301 moves the printing apparatus 1 in the direction X.

When the printing-apparatus-side CPU 166 acquires the predetermined signal representing that the spacer member 151 has been attached from the spacer member detection section 163, the printing-apparatus-side CPU 166 determines that the printing apparatus 101 operates in the first mode, whereas when the printing-apparatus-side CPU 166 does not acquire the predetermined signal, the printing-apparatus-side CPU 166 determines that the printing apparatus 101 operates in the second mode.

Figure 12:
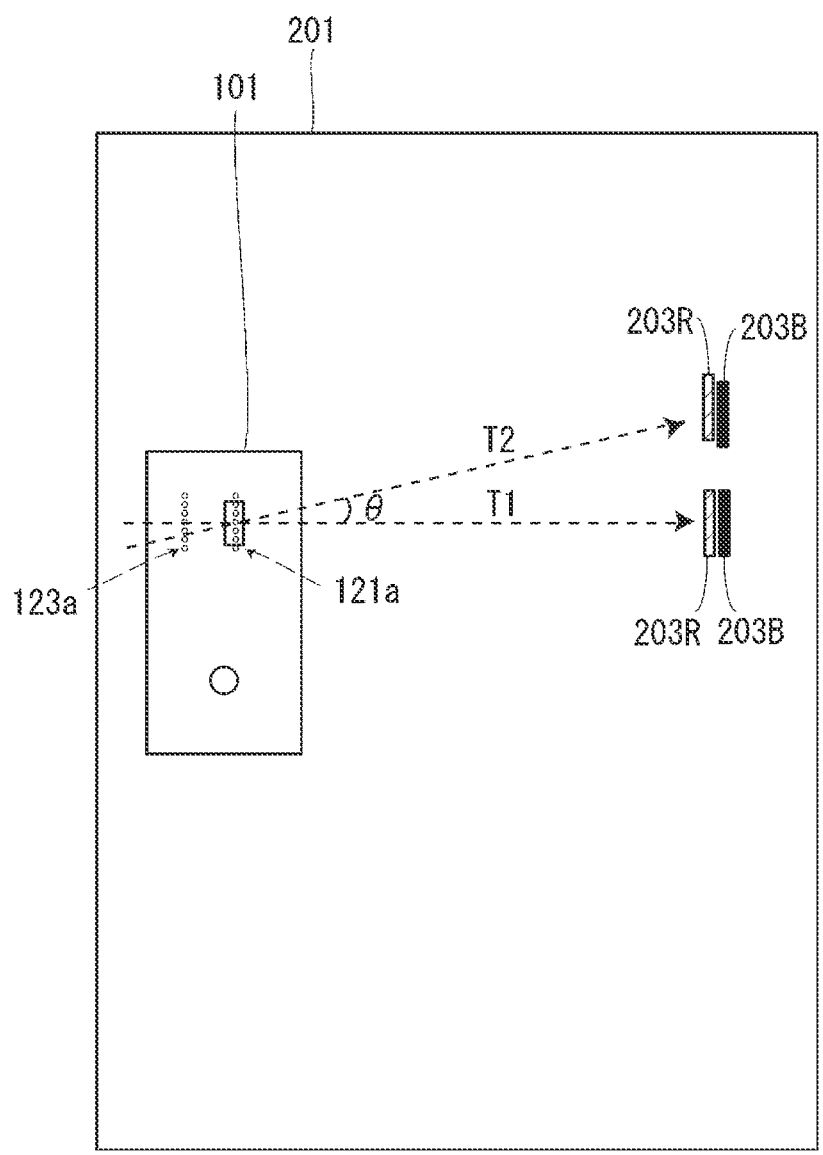
FIG. 12 compares a case where the printing apparatus performs multicolor printing while being moved in the direction X with a case where the printing apparatus performs the multicolor printing while being moved in an oblique direction with respect to the direction X.

In the first mode, the printing apparatus 101 can be moved in an oblique direction with respect to the direction X, as described above. FIG. 12 compares a case where the printing apparatus 101 performs the multicolor printing while being moved in the direction X with a case where the printing apparatus 101 performs the multicolor printing while being moved in an oblique direction with respect to the direction X. The first nozzle row 121a and the second nozzle row 123a, which are the two nozzle rows provided in the printing apparatus 101, are so provided as to be separate from each other in the direction X, as described above.

If the printing apparatus 101 is moved along the direction X, as indicated by a first movement trajectory T1, a black print image 203B, which is drawn by the black ink that is discharged via the nozzles of the first nozzle row 121a and lands on the medium 201, and a red print image 203R, which is drawn by the red ink that is discharged via the nozzles of the second nozzle row 123a and lands on the medium 201, do not shift from each other in the direction Y. The black print image 203B and the red print image 203R are each a print image 203 printed in the same position in the directions X and Y. FIG. 12 shows for convenience that the black print image 203B and the red print image 203R are shifted from each other in the direction X.

On the other hand, when the printing apparatus 101 is moved along an oblique direction with respect to the direction X, as indicated by a second movement trajectory T2, the black print image 203B and the red print image 203R shift from each other in the direction Y. The positional shift occurs due to the fact that the first nozzle row 121a and the second nozzle row 123a are so provided as to be separate from each other in the direction X.

To solve the problem described above, when the printing apparatus 101 according to the present embodiment operates in the first mode and performs the multicolor printing, the printing apparatus 101 carries out an error process when the moving direction of the printing apparatus 101 angularly deviates from the direction X by a threshold or greater. That is, the printing apparatus 101 carries out the error process when the printing apparatus 101 is manually moved and an angle θ between the moving direction of the printing apparatus 101 and the direction X is greater than or equal to the threshold.

Figure 13:
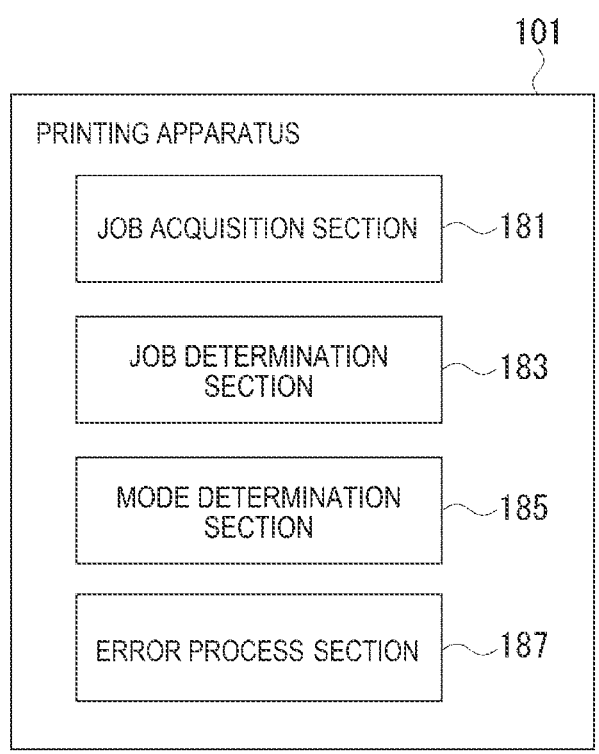
FIG. 13 is a functional block diagram of the printing apparatus.

The functional configuration of the printing apparatus 101 will be described with reference to FIG. 13. The printing apparatus 101 includes a job acquisition section 181, a job determination section 183, a threshold setting section 185, and an error process section 187. The functional sections described above are all achieved when the printing-apparatus-side CPU 166 executes a control program stored in the printing-apparatus-side ROM 167.

The job acquisition section 181 acquires a print job from the information processing apparatus 1 via the printing-apparatus-side communication section 161.

The job determination section 183 evaluates whether or not printing using both the first printing head 121 and the second printing head 123, that is, the multicolor printing is performed based on the print job acquired by the job acquisition section 181. When the acquired print job contains print data for multicolor printing, the job determination section 183 determines that the multicolor printing is performed, whereas when the acquired print job contains only print data for single-color printing, that is, when the acquired print job contains no print data for multicolor printing, the job determination section 183 determines that multicolor printing is not performed.

The threshold setting section 185 sets the threshold, which is an evaluation reference in accordance with which the error process is carried out, at a value that differs between a case where the job acquisition section 181 acquires an image printing print job and a case where the job acquisition section 181 acquires a text printing print job. The image printing print job is a print job generated when the image option 23b is selected in the print type selection field 23 of the printing instruction screen 21 (see FIG. 10). The text printing print job is a print job generated when the text option 23a is selected in the print type selection field 23 of the printing instruction screen 21.

The error process section 187 carries out the error process when the spacer member detection section 163 detects the spacer member 151, that is, the printing apparatus 101 operates in the first mode and the printing apparatus 101 performs the multicolor printing and when the moving direction detected by the movement detection sensor 125 deviates from the direction X by an angle greater than or equal to the threshold. In other words, when the printing apparatus 101 performs the single-color printing and operates in the second mode, the error processing section 187 does not carry out the error process when the moving direction detected by the movement detection sensor 125 deviates from the direction X by an angle greater than or equal to the threshold. The error process section 187 in the present embodiment performs error notification and cancels the printing as the error process.

A printing control process carried out by the information processing apparatus 1 and a printing process carried out by the printing apparatus 101 will be described with reference to FIGS. 14 and 15. It is assumed that the information processing apparatus 1 has activated the dedicated application program 17*a* to display the printing instruction screen 21 on the operation and display section 11.

In step S01, the information processing apparatus 1 accepts an input to the printing instruction screen 21. The information processing apparatus 1 accepts selection of the print type and input of information corresponding to the selected print type via the printing instruction screen 21.

In step S02, the information processing apparatus 1 displays the printing setting screen 31 on the operation and display section 11.

In step S03, the information processing apparatus 1 accepts settings of the printing setting screen 31. The information processing apparatus 1 accepts selection of the moving direction and the print color via the printing setting screen 31.

In step S04, the information processing apparatus 1 generates a print job based on the information inputted via the printing instruction screen 21 and the settings of the printing setting screen 31.

In step S05, the information processing apparatus 1 transmits the print job generated in step S04 to the printing apparatus 101.

In step S06, the printing apparatus 101 receives the print job transmitted from the information processing apparatus 1.

In step S07, the printing apparatus 101 evaluates based on the print job received in step S06 whether or not to perform the multicolor printing. The printing apparatus 101 determines to perform the multicolor printing when a print job containing print data for multicolor printing is received in step S06 and determines not to perform the multicolor printing when a print job not containing print data for multicolor printing is received in step S06. The printing apparatus 101 proceeds to step S08 when having determined to perform the multicolor printing. The printing apparatus 101 proceeds to step S31 in FIG. 15 when having determined not to perform the multicolor printing.

In step S08, the printing apparatus 101 evaluates whether or not it operates in the first mode, that is, whether or not the spacer member 151 has been attached. The printing apparatus 101 proceeds to step S09 when the printing apparatus 101 determines that it operates in the first mode. The printing apparatus 101 proceeds to step S31 in FIG. 15 when the printing apparatus 101 determines that it does not operate in the first mode.

In step S09, the printing apparatus 101 sets the threshold, which is the evaluation reference in accordance with which the error process is carried out, in accordance with the print type. The printing apparatus 101 sets a first threshold when an image printing print job is acquired in step S06, that is, when a print job to which information representing an "image" as the print type is added is acquired in step S06. The printing apparatus 101 sets a second threshold greater than the first threshold when a text printing print job is acquired in step S06, that is, when a print job to which information representing a "text" as the print type is added is acquired in step S06. The printing apparatus 101 can thus more strictly evaluate whether the moving direction deviates by an angle greater than or equal to the threshold when an image is printed than when a text is printed.

In step S10, the printing apparatus 101 evaluates whether or not printing start operation has been performed. When the printing button 115 is pressed for a short period, the printing apparatus 101 determines that the printing start operation has been performed. The printing apparatus 101 proceeds to step S11 when having determined that the printing start operation had been performed. The printing apparatus 101 repeats step S10 when having determined that the printing start operation had not been performed.

In step S11, the printing apparatus 101 detects the moving direction of the printing apparatus 101 and starts the printing. The printing apparatus 101 uses the movement detection sensor 125 to detect the moving direction of the printing apparatus 101. Since the multicolor printing is performed in this case, the printing apparatus 101 controls the first printing head 121 and the second printing head 123 to perform the printing.

In step S12, the printing apparatus 101 evaluates whether or not the moving direction of the printing apparatus 101 deviates from the direction X by an angle greater than or equal to the threshold. The printing apparatus 101 proceeds to step S13 when having determined that the moving direction of the printing apparatus 101 has deviated from the direction X by an angle greater than or equal to the threshold. The printing apparatus 101 proceeds to step S17 when having determined that the moving direction of the printing apparatus 101 has not deviated from the direction X by an angle greater than or equal to the threshold.

In step S13, the printing apparatus 101 performs the error notification. The printing apparatus 101 performs the error notification by causing the LED built in the printing button 115 to flicker.

In step S14, the printing apparatus 101 cancels the printing.

In step S15, the printing apparatus 101 transmits printing cancelation notification representing that the printing has been canceled to the information processing apparatus 1.

In step S16, the information processing apparatus 1 receives the printing cancelation notification transmitted from the printing apparatus 101.

In step S17, the printing apparatus 101 evaluates whether or not the printing corresponding to one pass has been completed. The printing apparatus 101 proceeds to step S18 when having determined that the printing corresponding to one pass had been completed. The printing apparatus 101 returns to step S12 when having determined that the printing corresponding one pass had not been completed.

In step S18, the printing apparatus 101 evaluates whether or not the printing corresponding to the entire pass has been completed. The printing apparatus 101 proceeds to step S19 when having determined that the printing corresponding to the entire pass had been completed. The printing apparatus 101 returns to step S10 when having determined that the printing corresponding to the entire pass has not been completed.

In step S19, the printing apparatus 101 transmits printing completion notification representing that the printing has been completed to the information processing apparatus 1.

In step S20, the information processing apparatus 1 receives the printing completion notification transmitted from the printing apparatus 101.

Figure 15:
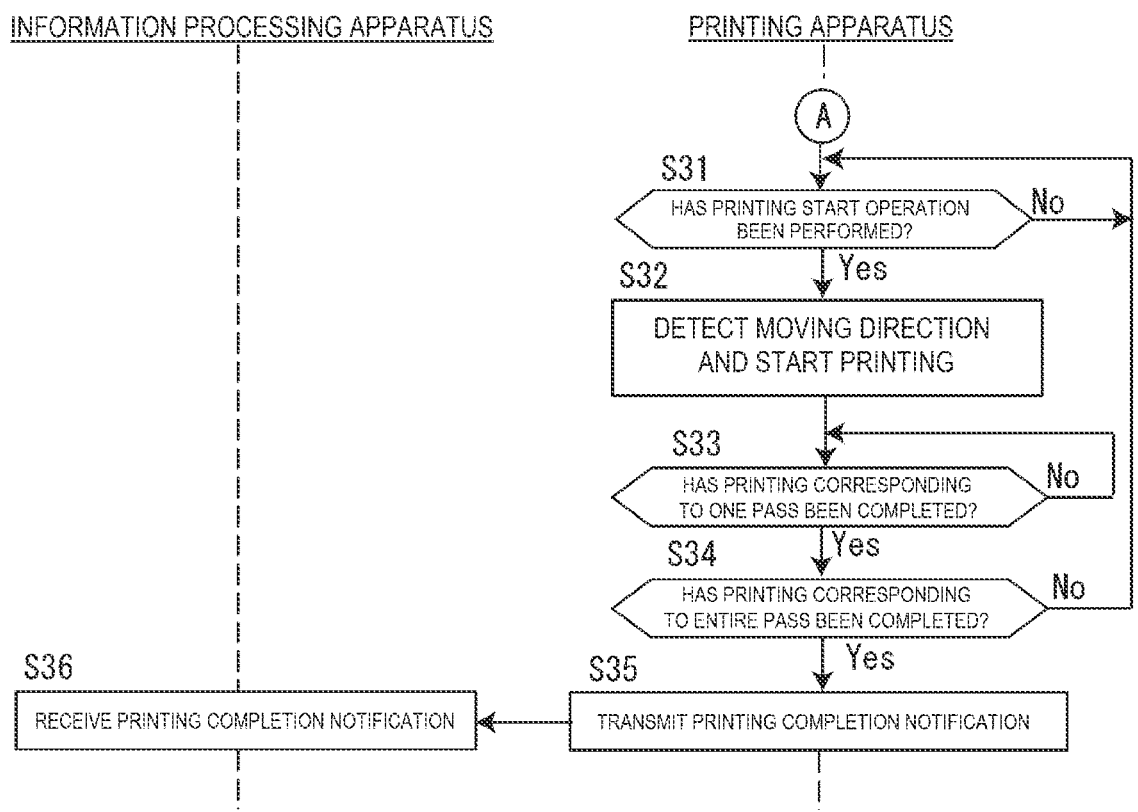
FIG. 15 is a flowchart following the flowchart in FIG. 14.

In step S31 in FIG. 15, the printing apparatus 101 evaluates whether or not the printing start operation has been performed. When the printing button 115 is pressed for a short period, the printing apparatus 101 determines that the printing start operation has been performed. The printing apparatus 101 proceeds to step S32 when having determined that the printing start operation had been performed. The printing apparatus 101 repeats step S31 when having determined that the printing start operation had not been performed.

In step S32, the printing apparatus 101 detects the moving direction of the printing apparatus 101 and starts the printing. The printing apparatus 101 uses the movement detection sensor 125 to detect the moving direction of the printing apparatus 101. To perform the single-color printing, the printing apparatus 101 controls the first printing head 121 to perform the printing, whereas to perform the multicolor printing, the printing apparatus 101 controls the first printing head 121 and the second printing head 123 to perform the printing.

In step S33, the printing apparatus 101 evaluates whether or not the printing corresponding to one pass has been completed. The printing apparatus 101 proceeds to step S34 when having determined that the printing corresponding to one pass had been completed. The printing apparatus 101 repeats step S33 when having determined that the printing corresponding one pass had not been completed.

In step S34, the printing apparatus 101 evaluates whether or not the printing corresponding to the entire pass has been completed. The printing apparatus 101 proceeds to step S35 when having determined that the printing corresponding to the entire pass had been completed. The printing apparatus 101 returns to step S31 when having determined that the printing corresponding to the entire pass had not been completed.

In step S35, the printing apparatus 101 transmits the printing completion notification representing that the printing has been completed to the information processing apparatus 1.

In step S36, the information processing apparatus 1 receives the printing completion notification transmitted from the printing apparatus 101.

As described above, the printing apparatus 101 according to the present embodiment carries out the error process when the multiple printing is performed and when the detected moving direction deviates from the direction X by an angle greater than or equal to the threshold. The printing apparatus 101 can therefore suppress the shift between the landing positions of the black ink and the red ink in the direction Y on the medium 201.

On the other hand, when the single-color printing is performed, that is, when no shift between the landing positions of the black ink and the red ink occurs, the printing apparatus 101 does not carry out the error process even when the detected moving direction deviates from the direction X by an angle greater than or equal to the threshold, whereby an unnecessary process can be eliminated. Further, the printing apparatus 101 does not carry out the error process also when the spacer member 151 is not attached, that is, when the moving direction of the printing apparatus 101 is not likely to deviate from the direction X, whereby an unnecessary process can be eliminated.

When an image printing print job is acquired, the printing apparatus 101 sets a threshold smaller than that used when a text printing print job is acquired. In general, one letter of a text is not printed in many cases by using the black ink and the red ink, but one image may be printed by using the black ink and the red ink. Therefore, when an image printing print job is acquired, setting a threshold smaller than that used when a text printing print job is acquired allows effective suppression of the shift between the landing positions of the black ink and the red ink.

Since the printing apparatus 101 includes the spacer member detection section 163, which detects whether or not the spacer member 151 has been attached, whether the printing apparatus 101 operates in the first mode or the second mode can be correctly determined.

The following variations of the embodiment can be employed.

Variation 1

The printing apparatus 101 according to the embodiment described above switches the operation mode between the first mode and the second mode in accordance with whether or not the spacer member 151 has been attached and may instead switch the operation mode between the first mode and the second mode in accordance with whether or not the first roller unit 117 and the second roller unit 119 have been attached. The first roller unit 117 and the second roller unit 119 are an example of the "restriction member."

Figure 16:
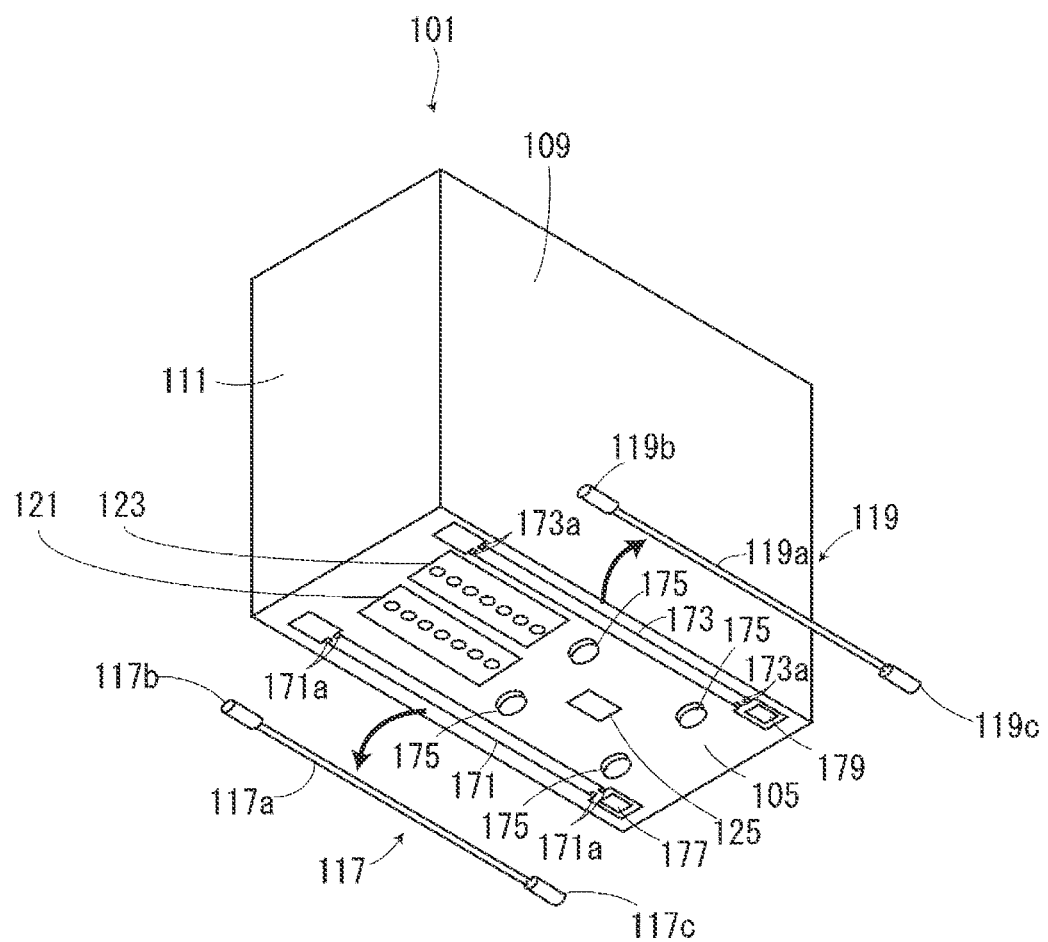
FIG. 16 is a perspective view of the external appearance of the printing apparatus to and from which roller units are attachable and detachable.
Figure 16:
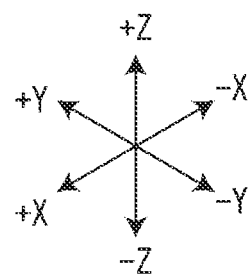

FIG. 16 is a perspective view of the external appearance of the printing apparatus 101 according to Variation 1. The printing apparatus 101 according to the present variation includes a first attachment section 171 and a second attachment section 173, to which the first roller unit 117 and the second roller unit 119 are attached, respectively, in end portions of the second outer surface 105 that are end portions facing the positive and negative sides of the direction X. Further, the printing apparatus 101 according to the present variation is provided with four second protrusions 175 at the second outer surface 105.

The first roller unit 117 is rotatably held when portions of the first shaft member 117a that are portions in the vicinity of the opposite ends in the direction Y engage with first slide bearings 171a of the first attachment section 171. The first slide bearings 171a each have a circumferential cutout, and the first shaft member 117a is attached to the first attachment section 171 via the cutouts.

Similarly, the second roller unit 119 is rotatably held when portions of the second shaft member 119a that are portions in the vicinity of the opposite ends in the direction Y engage with second slide bearings 173a of the second attachment section 173. The second slide bearings 173a each have a circumferential cutout, and the second shaft member 119a is attached to the second attachment section 173 via the cutouts.

Two of the four second protrusions 175 are so provided as to be close to a side of the movement detection sensor 125 that is the side facing the positive side of the direction Y with the two protrusions 175 being separate from each other in the direction X. The remaining two of the four second protrusions 175 are so provided as to be close to a side of the movement detection sensor 125 that is the side facing the negative side of the direction Y with the two protrusions 175 being separate from each other in the direction X. In the state in which neither the first roller unit 117 nor the second roller unit 119 is attached to the first attachment section 171 or the second attachment section 173, the four second protrusions 175 come into contact with the medium. 201 when the printing apparatus 101 is placed on the medium 201. The printing apparatus 101 to which neither the first roller unit 117 nor the second roller unit 119 is attached can therefore slidably move on the medium 201. On the other hand, in the state in which the first roller unit 117 and the second roller unit 119 are attached to the first attachment section 171 and the second attachment section 173, respectively, the four rollers come into contact with the medium 201 when the printing apparatus 101 is placed on the medium 201.

In the printing apparatus 101 according to the present variation, a first unit detection section 177 provided in the first attachment section 171 detects whether or not the first roller unit 117 has been attached to the first attachment section 171. The first unit detection section 177 is formed of a physical switch that sinks into the first attachment section 171 when the first roller unit 117 is attached to the first attachment section 171 and the first rear roller 117c therefore comes into contact with the first unit detection section 177. Further, in the printing apparatus 101, a second unit detection section 179 provided in the second attachment section 173 detects whether or not the second roller unit 119 has been attached to the second attachment section 173. The second unit detection section 179 is formed of a physical switch that sinks into the second attachment section 173 when the second roller unit 119 is attached to the second attachment section 173 and the second rear roller 119c therefore comes into contact with the second unit detection section 179. The first unit detection section 177 and the second unit detection section 179 are an example of a "second attachment detection section."

The printing apparatus 101 determines that it operates in the second mode when having detected that the first roller unit 117 and the second roller unit 119 have been attached, whereas the printing apparatus 101 determines that it operates in the first mode when having detected that the first roller unit 117 or the second roller unit 119 has not been attached. The printing apparatus 101 performs the error notification when having detected that only one of the first roller unit 117 and the second roller unit 119 has been attached.

As described above, the printing apparatus 101 according to the present variation can evaluate whether the printing apparatus 101 operates in the first mode or the second mode by detecting whether or not the first roller unit 117 and the second roller unit 119 have been attached.

As another variation, the printing apparatus 101 may be so configured that the second outer surface 105 can accommodate the first roller unit 117 and the second roller unit 119. In the state in which the first roller unit 117 and the second roller unit 119 are accommodated, the surface of each of the rollers is not contact with the medium 201 when the printing apparatus 101 is placed on the medium 201. In this case, the printing apparatus 101 detects with the aid of a detection mechanism that is not shown whether or not the first roller unit 117 and the second roller unit 119 are accommodated. The printing apparatus 101 determines that it operates in the first mode when having detected that the first roller unit 117 and the second roller unit 119 had been accommodated, whereas the printing apparatus 101 determines that it operates in the second mode when having detected that neither the first roller unit 117 nor the second roller unit 119 had been accommodated.

Variation 2

Figure 17:
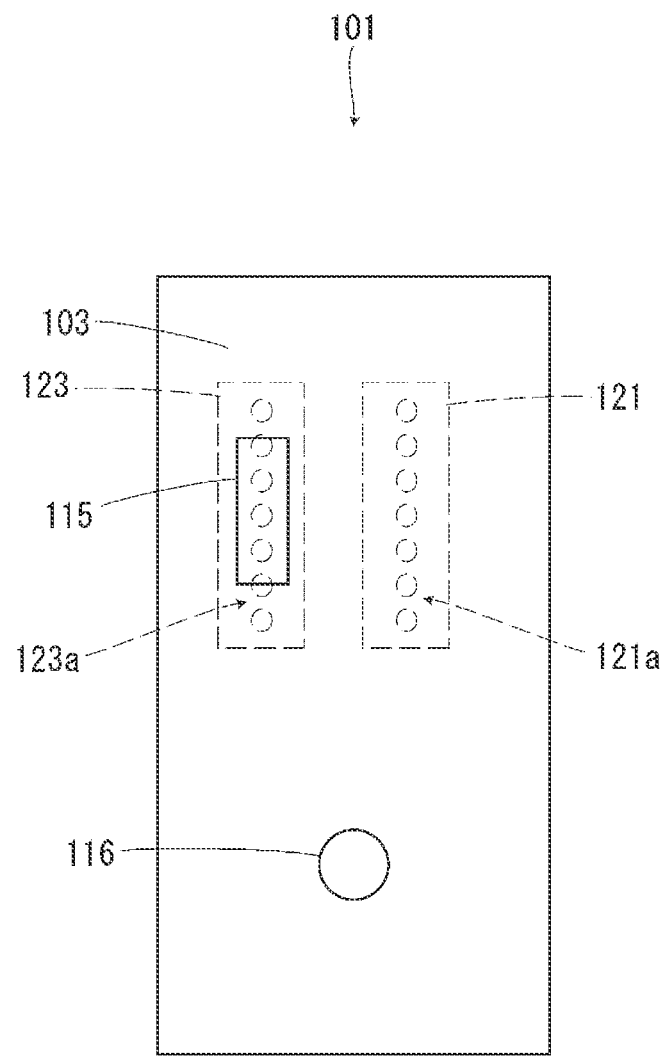
FIG. 17 shows the printing apparatus including a printing button in a variation viewed from the side facing the positive side of the direction Z.
Figure 17:
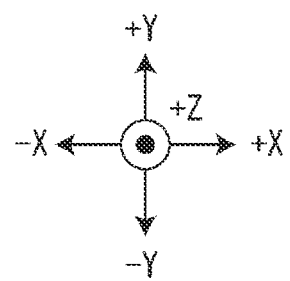

In the printing apparatus 101 according to the embodiment described above, the printing button 115 is provided in a position shifted from the first printing head 121 in the direction +Z. The printing button 115 may instead be provided in a position shifted from the second printing head 123 in the direction +Z, as shown in FIG. 17. That is, the printing button 115 may be provided at the first outer surface 103 in a position corresponding to the second printing head 123. The situation in which the printing button 115 is provided in a position corresponding to the second printing head 123 means that the printing button 115 falls within the range of the second printing head 123 in the directions X and Y.

As still another variation, the printing button 115 may fall within the range of the second printing head 123 only in the direction X. As still another variation of the embodiment described above, the printing button 115 may fall within the range of the first printing head 121 only in the direction X.

Variation 3

Figure 18:
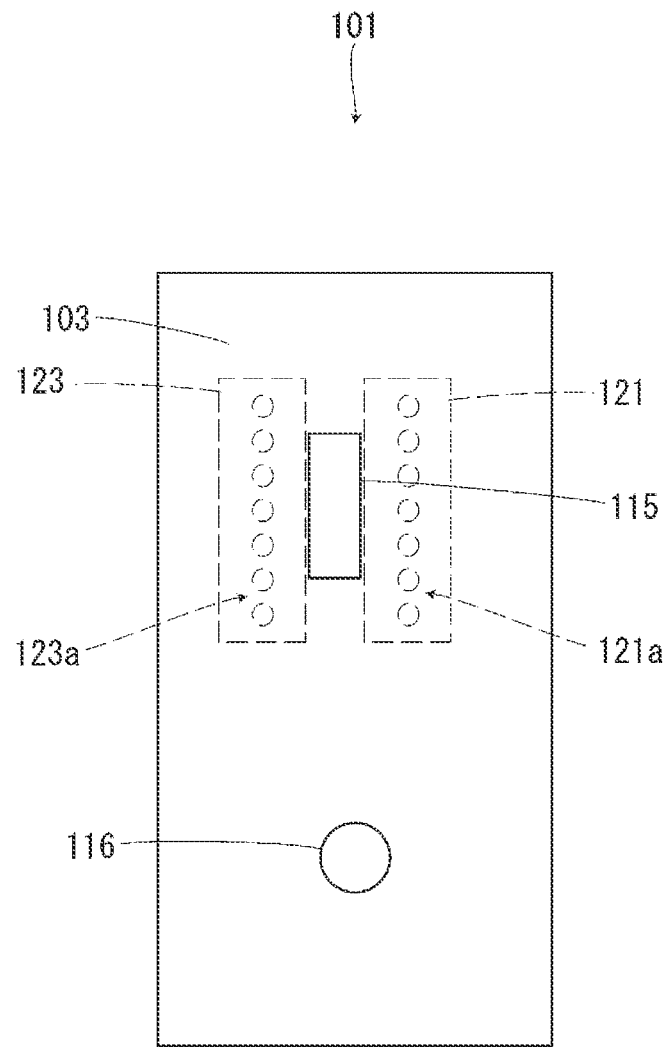
FIG. 18 shows the printing apparatus including a printing button in a variation different from the variation shown in FIG. 17 and viewed from the side facing the positive side of the direction Z.
Figure 18:
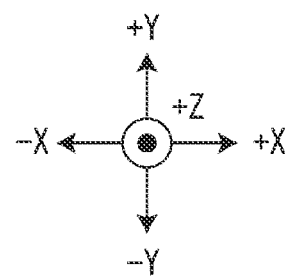

In the printing apparatus 101, the printing button 115 may be provided in a position between the first printing head 121 and the second printing head 123 but separate therefrom in the direction +Z, as shown in FIG. 18. That is, the printing button 115 may be provided at the first outer surface 103 in a position corresponding to the space between the first printing head 121 and the second printing head 123. The situation in which the printing button 115 is provided in a position corresponding to the space between the first printing head 121 and the second printing head 123 means that the printing button 115 falls within the space between the range of the first printing head 121 and the range of the second printing head 123 in the directions X and Y.

The thus positioned printing button 115 can show the user 301 the positions where the first printing head 121 and the second printing head 123 are provided, that is, the positions where the first printing head 121 and the second printing head 123 perform printing.

As still another variation, the printing button 115 may fall within the space between the range of the first printing head 121 and the range of the second printing head 123 only in the direction X.

Variation 4

In the embodiment described above, the printing apparatus 101 performs the error notification, and the information processing apparatus 1 may instead perform the error notification. In this case, when the printing apparatus 101 performs the multicolor printing, operates in the first mode, and determines that the detected moving direction deviates from the direction X by an angle greater than or equal to the threshold, the printing apparatus 101 transmits error information to the information processing apparatus 1. The information processing apparatus 1 displays an error screen 51 (see FIG. 19) based on the error information received from the printing apparatus 101.

Figure 19:
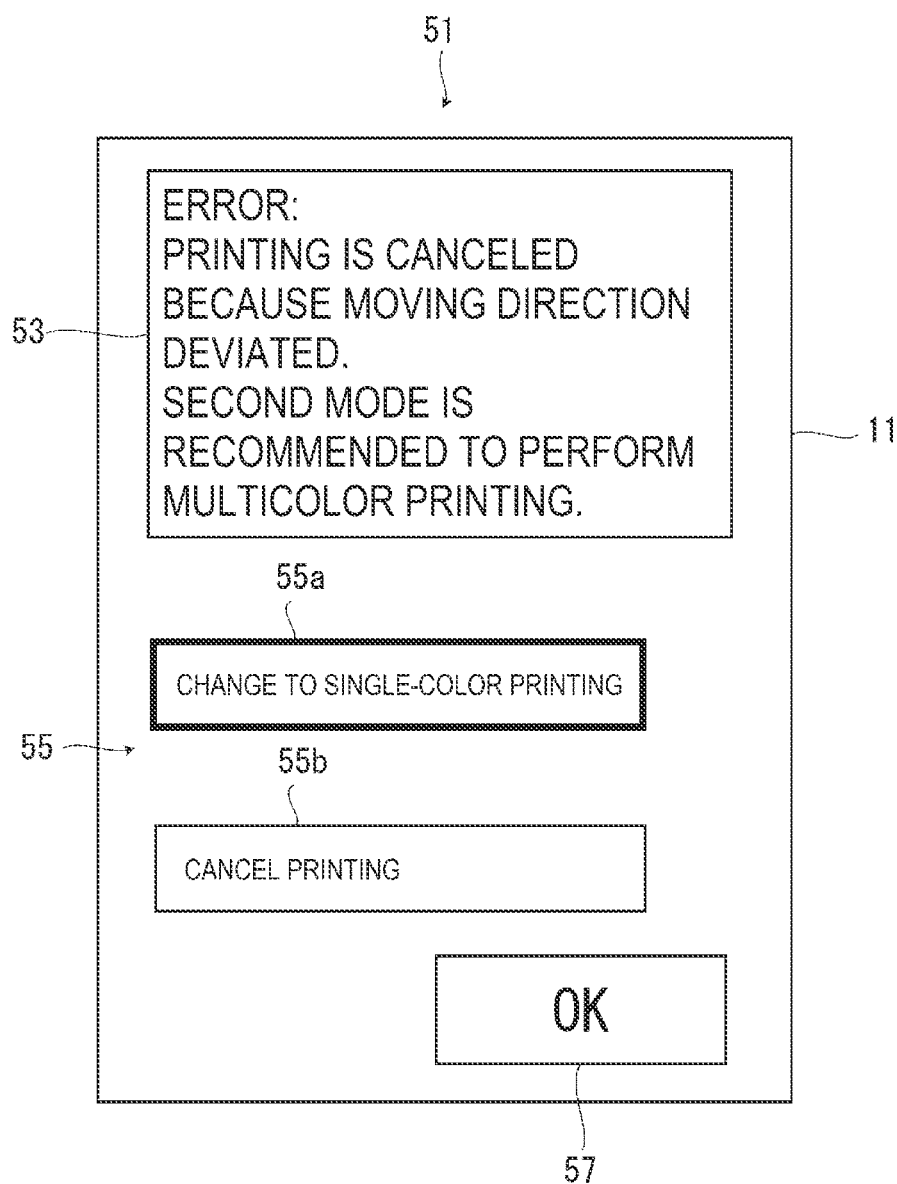
FIG. 19 shows an error screen.

The error screen 51 has an error message 53, an error selection field 55, and a third OK button 57, as shown in FIG. 19.

The error message 53 is a message stating that the printing is canceled because the moving direction deviates from the direction X and the second mode is recommended when the multicolor printing is performed. The error selection field 55 displays a change-to-single-color option 55a and a printing cancelation option 55b as a selectable option. The third OK button 57 accepts operation of finalizing selection in the error selection field 55.

When the information processing apparatus 1 accepts operation performed on the third OK button 57 with the change-to-single-color option 55a selected, the information processing apparatus 1 converts print data containing black-ink data and red-ink data into single-color print data containing only the black-ink data and transmits a print job containing the converted print data to the printing apparatus 101. When the information processing apparatus 1 accepts operation performed on the third OK button 65 with the printing cancelation option 69 selected, the information processing apparatus 1 transmits printing cancelation information to the printing apparatus 101.

Figure 14:
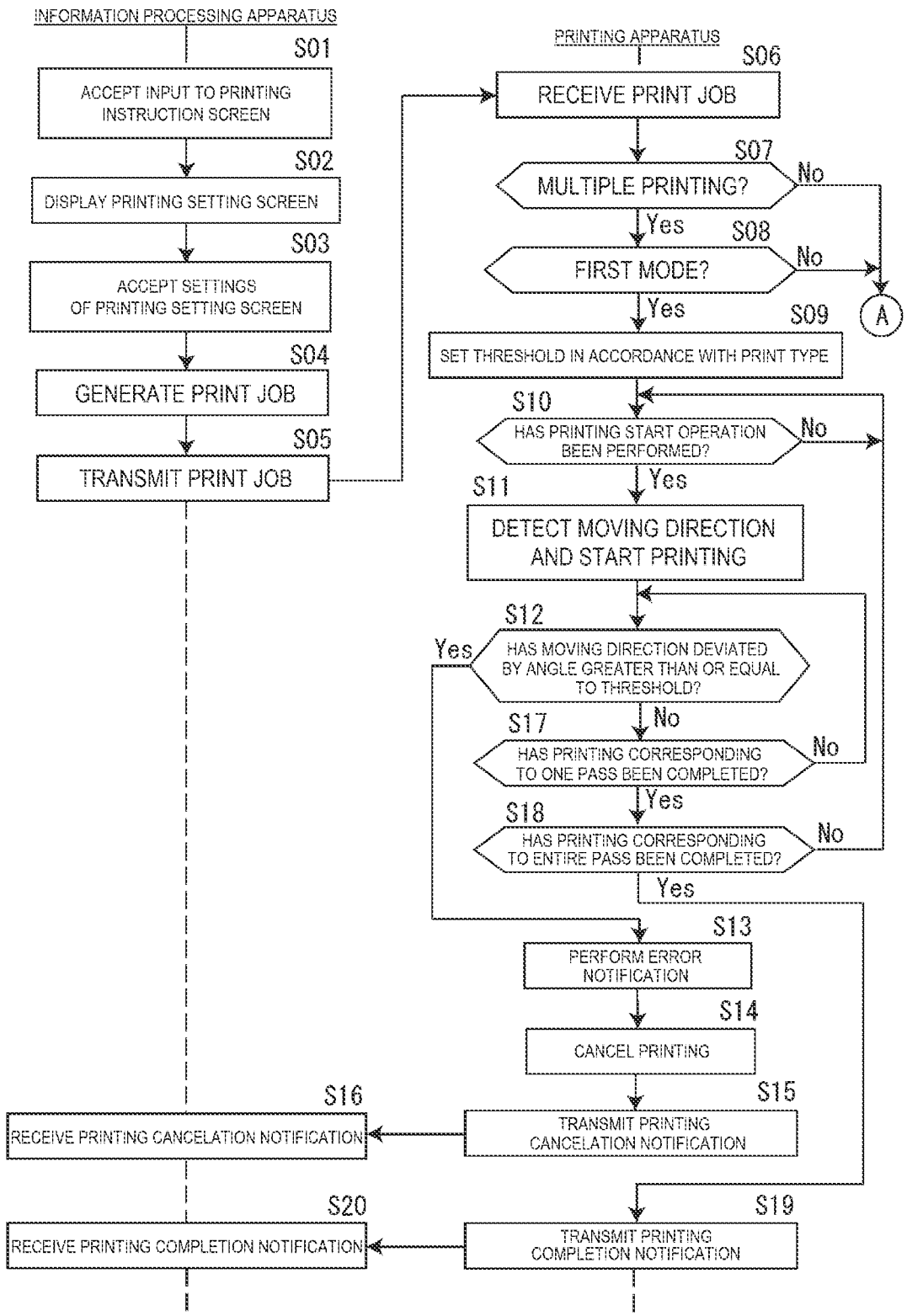
FIG. 14 is a flowchart showing a printing control process carried out by an information processing apparatus and a printing process carried out by the printing apparatus.

Upon reception of the print job containing the single-color print data from the information processing apparatus 1, the printing apparatus 101 carries out step S06 and the following steps in FIG. 14. Upon reception of the printing cancelation information from the information processing apparatus 1, the printing apparatus 101 cancels the printing.

Variation 5

Figure 20:
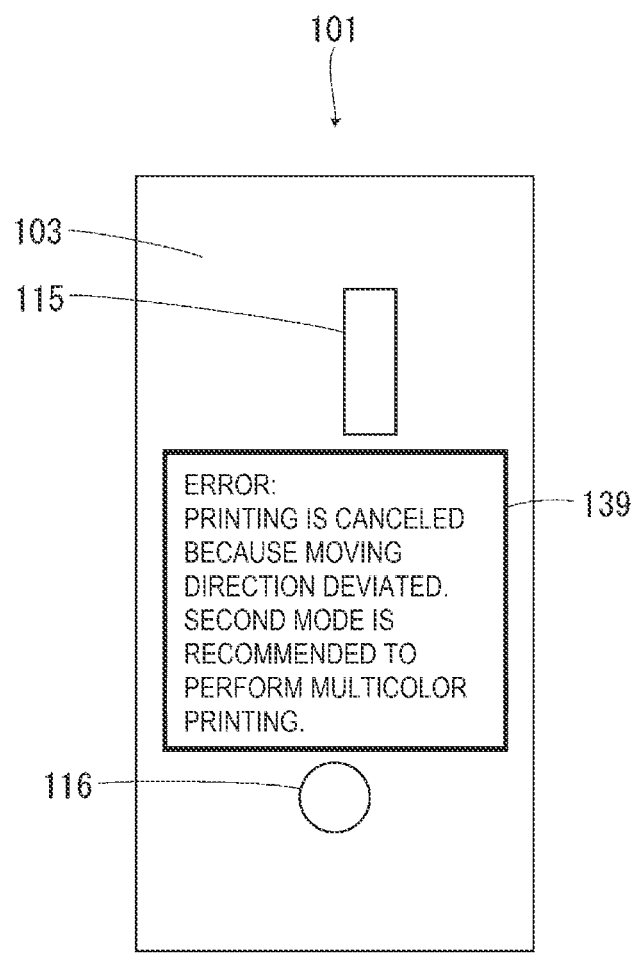
FIG. 20 shows the printing apparatus including a display viewed from the side facing the positive side of the direction Z.
Figure 20:
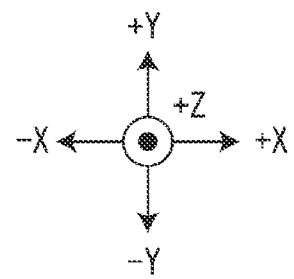

The printing apparatus 101 according to the embodiment described above performs the error notification by causing the LED built in the printing button 115 to flicker and may instead perform the error notification by using a component other than the printing button 115. For example, the printing apparatus 101 may perform the error notification by using a display 139, as shown in FIG. 20. In this case, the printing apparatus 101 may cause the display 139 to display a message stating that the printing is canceled because the moving direction deviates from the direction X and the second mode is recommended to perform the multicolor printing.

As still another variation, the printing apparatus 101 may perform the error notification in the form of sound or vibration.

Variation 6

The printing apparatus 101 according to the embodiment described above acquires a print job from the information processing apparatus 1 and may instead acquire a print job from an external storage medium, such as a flash memory.

As still another variation, the printing apparatus 101 may itself generate a print job. In this case, the printing apparatus 101 may evaluate whether or not to perform the multiple printing based on the generated print job.

Variation 7

The printing apparatus 101 according to the embodiment described above acquires a print job containing a plurality of pass-basis print jobs when printing the print image 203 in a plurality of passes and may instead acquire a print job on a pass-basis job basis. In this case, when the printing apparatus 101 accepts the printing start operation or completes the printing for a pass, the printing apparatus 101 may request the information processing apparatus 1 to send a pass-basis job for the following pass.

Variation 8

The printing apparatus 101 according to the embodiment described above sets the threshold at a value that differs between the case where an image printing print job is acquired and the case where a text printing print job is acquired and may set further different thresholds in accordance with the print type of the print data. For example, when a print job for printing a code image, such as a two-dimensional code or a barcode, is acquired, the printing apparatus 101 may set a threshold further smaller than the threshold set when an image printing print job is acquired. Further, the first threshold set when an image printing print job is acquired may be greater than the second threshold set when a text printing print job is acquired.

As a still another variation, the printing apparatus 101 may set different thresholds in accordance with the size of the print image 203 printed based on the print data. For example, when a print job containing print data for printing a print image 203 having a first size is acquired, the printing apparatus 101 may set a threshold smaller than the threshold set when a print job containing print data for printing a print image 203 having a second size greater than the first size is acquired.

Variation 9

When performing the single-color printing, the printing apparatus 101 according to the embodiment described above does not carry out the error process even when the detected moving direction deviates from the direction X by an angle greater than or equal to the threshold. However, when the printing apparatus 101 performs printing by using the first printing head 121 and the second printing head 123, for example, when the first printing head 121 and the second printing head 123 both discharge the black ink, it is preferable that the printing apparatus 101 carries out the error process even when performing the single-color printing.

Variation 10

The printing apparatus 101 according to the embodiment described above sets the threshold but may instead set no threshold. For example, when the printing apparatus 101 incorporates a detector that outputs a predetermined signal when detecting that the moving direction of the printing apparatus 101 has deviated from the direction X, the printing apparatus 101 may determine that the moving direction of the printing apparatus 101 has deviated from the direction X when the detector outputs the predetermined signal. In this case, the printing apparatus 101 needs to set no threshold.

Variation 11

The printing apparatus 101 according to the embodiment described above cancels printing as part of the error process and may instead stop driving one of the first printing head 121 and the second printing head 123. For example, the printing apparatus 101 may change, as part of the error process, print data contained in a print job to single-color print data process and perform printing by driving only the first printing head 121. In this case, the printing apparatus 101 may generate the single-color print data by deleting red-ink data from the print data containing black-ink data and red-ink data. The printing apparatus 101 may instead generate the single-color print data by combining the black-ink data and the red-ink data with each other into fully-black-ink data.

Variation 12

The moving direction of the printing apparatus 101 is not necessarily determined only by the result of the detection performed by the movement detection sensor 125 and may be determined by using the result of detection performed by a gyro sensor that detects the angular velocity of the printing apparatus 101.

Variation 13

The first nozzle row 121a and the second nozzle row 123a may not be provided in different printing heads and may instead be provided in a common printing head.

The black ink cartridge 131 and the red ink cartridge 133 may not be separately loaded into the printing apparatus 101 and may be loaded as an integrated cartridge into the printing apparatus 101.

The number of nozzle rows provided in the printing apparatus 101 is not limited to two and may be three or more. In this case, the printing apparatus 101 may be capable of color printing by discharging cyan ink, magenta ink, and yellow ink via the nozzles of the respective nozzle rows.

Variation 14

The first nozzle row 121a and the second nozzle row 123a may discharge liquid other than ink. For example, the first nozzle row 121a and the second nozzle row 123a may discharge an adhesive, a coating agent, or any other liquid. In addition, the discharged liquid may be changed as appropriate to the extent that the change does not depart from the substance of the present disclosure.

Additional Remarks

The printing apparatus and the method for controlling the printing apparatus will be additionally described below.

The printing apparatus 101 is a printing apparatus 101 that performs printing on a medium while being manually moved relative to the medium, the printing apparatus 101 including a first discharger including a first nozzle row that discharges a first liquid, a second discharger including a second nozzle row that discharges a second liquid and is so provided as to be separate from the first nozzle row in a first direction perpendicular to the first nozzle row, and a movement detection section that detects the moving direction of the printing apparatus 101 viewed from the side facing the printing apparatus 101 while the printing apparatus 101 is moved, and an error process section 187, which carries out an error process when printing using both the first and second dischargers is performed and the moving direction detected by the movement detection section deviates from the first direction.

The method for controlling the printing apparatus 101 is a method for controlling a printing apparatus 101 including a first discharger including a first nozzle row that discharges a first liquid, a second discharger including a second nozzle row that discharges a second liquid and is so provided as to be separate from the first nozzle row in a first direction perpendicular to the first nozzle row, and a movement detection section that detects the moving direction of the printing apparatus 101 viewed from the side facing the printing apparatus 101 while the printing apparatus 101 is moved, the printing apparatus performing printing on a medium by using at least one of the first and second dischargers while the printing apparatus is manually moved relative to the medium, the method including carrying out an error process when printing using both the first and second dischargers is performed and the moving direction detected by the movement detection section deviates from the first direction.

According to the configuration described above, the printing apparatus 101 that performs printing using both the first and second dischargers carries out the error process when the detected moving direction deviates from the first direction. The printing apparatus 101 can therefore suppress the shift between the landing positions of the first liquid and the second liquid on the medium in the direction in which the nozzle rows are arranged.

It is preferable in the printing apparatus 101 described above that the error process section 187 does not carry out the error process when printing using one of the first and second dischargers is performed and the moving direction detected by the movement detection section deviates from the first direction.

According to the configuration described above, when the printing apparatus 101 performs printing using one of the first and second dischargers, that is, when no shift between the landing positions of the first liquid and the second liquid occurs, the printing apparatus 101 does not carry out the error process even when the detected moving direction deviates from the first direction, whereby an unnecessary process can be eliminated.

It is preferable that the printing apparatus 101 described above further includes the job acquisition section 181, which acquires a job, and the job determination section 183, which evaluates based on the print job acquired by the job acquisition section 181 whether or not printing using both the first and second dischargers is performed or printing using one of the first and second dischargers is performed, and that the error process section 187 carries out the error process when the job determination section 183 determines that printing using both the first and second dischargers is performed and the moving direction detected by the movement detection section deviates from the first direction, and the error process section 187 does not carry out the error process when the job determination section 183 determines that printing using one of the first and second dischargers is performed and the moving direction detected by the movement detection section deviates from the first direction.

According to the configuration described above, the printing apparatus 101 can evaluate based on the acquired print job whether or not printing using both the first and second dischargers is performed.

In the printing apparatus 101 described above, it is preferable that the error process section 187 carries out the error process when the job determination section 183 determines that printing using both the first and second dischargers is performed and the moving direction detected by the movement detection section deviates from the first direction by an angle greater than or equal to the threshold, and that the printing apparatus 101 further includes the threshold setting section 185, which sets the threshold at a value that differs between the case where the job acquisition section 181 acquires an image printing print job and the case where the job acquisition section 181 acquires a text printing print job.

According to the configuration described above, the threshold can be set at a value that differs between the case where an image printing print job is acquired and the case where a text printing print job is acquired.

It is preferable that the printing apparatus 101 described above further includes a restriction member that restricts movement of the printing apparatus 101 in directions other than the first direction, a release member that releases the restriction imposed by the restriction member and is attachable to and detachable from the printing apparatus 101, and a first attachment detection section that detects whether or not the release member has been attached to the printing apparatus 101, and that the error process section 187 carries out the error process when the first attachment detection section detects that the release member has been attached, printing using both the first and second dischargers is performed, and the moving direction detected by the movement detection section deviates from the first direction.

According to the configuration described above, the printing apparatus 101 can carry out the error process when it is detected that the release member has been attached, that is, when the moving direction of the printing apparatus 101 is likely to deviate from the first direction.

It is preferable that the printing apparatus 101 described above further includes a restriction member that restricts movement of the printing apparatus 101 in directions other than the first direction and is attachable to and detachable from the printing apparatus 101 and a second attachment detection section that detects whether or not the restriction member has been attached to the printing apparatus 101, and that the error process section 187 carries out the error process when the second attachment detection section detects that the restriction member has not been attached, printing using both the first and second dischargers is performed, and the moving direction detected by the movement detection section deviates from the first direction.

According to the configuration described above, the printing apparatus 101 can carry out the error process when it is detected that the restriction member has not been attached, that is, when the moving direction of the printing apparatus 101 is likely to deviate from the first direction.

In the printing apparatus 101 described above, it is preferable that the error process section 187 cancels the printing or stops driving one of the first and second dischargers as at least part of the error process.

According to the configuration described above, the printing apparatus 101 can cancel the printing or stop driving one of the first and second dischargers as at least part of the error process.

It is preferable that the printing apparatus 101 described above further includes a guide section that guides the user to the position of the first or second discharger, that the guide section is provided at one of a plurality of outer surfaces of the printing apparatus 101 that is an opposite outer surface from the outer surface where the first and second dischargers are provided, and that the guide section is positioned at a location corresponding to the first or second discharger in the first direction.

According to the configuration described above, the printing apparatus 101 can guide the user to the position of the first or second discharger in the first direction.

It is preferable that the printing apparatus 101 described above further includes a guide section that guides the user to the positions of the first and second dischargers, that the guide section is provided at one of a plurality of outer surfaces of the printing apparatus 101 that is an opposite outer surface from the outer surface where the first and second dischargers are provided, and that the guide section is positioned at a location corresponding to the space between the first and second dischargers in the first direction.

According to the configuration described above, the printing apparatus 101 can guide the user to the positions of the first and second dischargers in the first direction.

In the printing apparatus 101 described above, it is preferable that the distance in the first direction between the center position of an outer surface of the plurality of the outer surfaces of the printing apparatus 101 and the first discharger is shorter than the distance between the center position and the second discharger, the outer surface being the surface where the first and second dischargers are provided.

According to the configuration described above, in the printing apparatus 101, the first discharger is provided in a position closer to the center position in the first direction than the second discharger. The user therefore readily grasps the position of the first discharger as the printing position, whereby the useability is improved when the first discharger is more frequently used than the second discharger. Further, in this case, it is necessary in the printing apparatus 101 to ensure that a space where the first liquid is stored is broader than the space where the second liquid is stored. However, since the second discharger is so provided as to be farther from the center than the first discharger, the path along which the second liquid is supplied from the space where the second liquid is stored to the second discharger can be advantageously shortened.

What is claimed is:

1. A printing apparatus that performs printing on a medium while being manually moved relative to the medium, the printing apparatus comprising:
    a first discharger including a first nozzle row that discharges a first liquid;
    a second discharger including a second nozzle row that discharges a second liquid and is so provided as to be separate from the first nozzle row in a first direction perpendicular to the first nozzle row;
    a movement detection section that detects a moving direction of the printing apparatus viewed from a side facing the printing apparatus while the printing apparatus is moved; and
    an error process section that carries out an error process when printing using both the first and second dischargers is performed and the moving direction detected by the movement detection section deviates from the first direction.

2. The printing apparatus according to claim 1, wherein the error process section does not carry out the error process when printing using one of the first and second dischargers is performed and the moving direction detected by the movement detection section deviates from the first direction.

3. The printing apparatus according to claim 2, further comprising:
    a job acquisition section that acquires a print job; and
    a job determination section that evaluates based on the print job acquired by the job acquisition section whether or not printing using both the first and second dischargers is performed or printing using one of the first and second dischargers is performed,
    wherein the error process section carries out the error process when the job determination section determines that the printing using both the first and second dischargers is performed and the moving direction detected by the movement detection section deviates from the first direction, and the error process section does not carry out the error process when the job determination section determines that the printing using one of the first and second dischargers is performed and the moving direction detected by the movement detection section deviates from the first direction.

4. The printing apparatus according to claim 3,
    wherein the error process section carries out the error process when the job determination section determines that the printing using both the first and second dischargers is performed and the moving direction detected by the movement detection section deviates from the first direction by an angle greater than or equal to a threshold, and
    the printing apparatus further comprises a threshold setting section that sets the threshold at a value that differs between a case where the job acquisition section acquires the print job that causes an image to be printed and a case where the job acquisition section acquires the print job that causes a text to be printed.

5. The printing apparatus according to claim 1, further comprising:
    a restriction member that restricts movement of the printing apparatus in directions other than the first direction;
    a release member that releases the restriction imposed by the restriction member and is attachable to and detachable from the printing apparatus; and
    a first attachment detection section that detects whether or not the release member is attached to the printing apparatus,
    wherein the error process section carries out the error process when the first attachment detection section detects that the release member is attached, the printing using both the first and second dischargers is performed, and the moving direction detected by the movement detection section deviates from the first direction.

6. The printing apparatus according to claim 1, further comprising:
    a restriction member that restricts movement of the printing apparatus in directions other than the first direction and is attachable to and detachable from the printing apparatus; and
    a second attachment detection section that detects whether or not the restriction member is attached to the printing apparatus,
    wherein the error process section carries out the error process when the second attachment detection section detects that the restriction member is not attached, the printing using both the first and second dischargers is performed, and the moving direction detected by the movement detection section deviates from the first direction.

7. The printing apparatus according to claim 1, wherein the error process section cancels the printing or stops driving one of the first and second dischargers as at least part of the error process.

8. The printing apparatus according to claim 1,
further comprising a guide section that guides a user to position of the first or second discharger,
wherein the guide section is provided at one of a plurality of outer surfaces of the printing apparatus that is an opposite outer surface from an outer surface where the first and second dischargers are provided, and the guide section is positioned at a location corresponding to the first or second discharger in the first direction.

9. The printing apparatus according to claim 1,
further comprising a guide section that guides a user to positions of the first and second dischargers,
wherein the guide section is provided at one of a plurality of outer surfaces of the printing apparatus that is an opposite outer surface from an outer surface where the first and second dischargers are provided, and the guide section is positioned at a location corresponding to a space between the first and second dischargers in the first direction.

10. The printing apparatus according to claim 1, wherein a distance in the first direction between a center position of an outer surface of a plurality of the outer surfaces of the printing apparatus and the first discharger is shorter than a distance between the center position and the second discharger, the outer surface being a surface where the first and second dischargers are provided.

11. A method for controlling a printing apparatus including
a first discharger including a first nozzle row that discharges a first liquid,
a second discharger including a second nozzle row that discharges a second liquid and is so provided as to be separate from the first nozzle row in a first direction perpendicular to the first nozzle row, and
a movement detection section that detects a moving direction of the printing apparatus viewed from a side facing the printing apparatus while the printing apparatus is moved,
the printing apparatus performing printing on a medium by using at least one of the first and second dischargers while the printing apparatus is manually moved relative to the medium,
the method comprising carrying out an error process when printing using both the first and second dischargers is performed and the moving direction detected by the movement detection section deviates from the first direction.

* * * * *